(12) United States Patent
Takahashi

(10) Patent No.: US 6,958,452 B2
(45) Date of Patent: Oct. 25, 2005

(54) CONVEYOR APPARATUS AND COMMODITY INSPECTING EQUIPMENT UTILIZING THE SAME

(75) Inventor: Atsushi Takahashi, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 19 days.

(21) Appl. No.: 10/765,162

(22) Filed: Jan. 28, 2004

(65) Prior Publication Data

US 2004/0182612 A1 Sep. 23, 2004

Related U.S. Application Data

(62) Division of application No. 10/009,832, filed as application No. PCT/JP01/03914 on May 10, 2001, now Pat. No. 6,803,529.

(30) Foreign Application Priority Data

| May 11, 2000 | (JP) | ............................ 2000-138304 |
| May 11, 2000 | (JP) | ............................ 2000-138590 |
| Jun. 29, 2000 | (JP) | ............................ 2000-196686 |
| Jun. 30, 2000 | (JP) | ............................ 2000-198656 |

(51) Int. Cl.⁷ ............................................. G01G 11/00
(52) U.S. Cl. ...................... 177/145; 198/813; 198/835
(58) Field of Search ........................ 177/119–121, 145; 198/813, 814, 835

(56) References Cited

U.S. PATENT DOCUMENTS

| 3,456,776 | A | * | 7/1969 | Viene | ........................ 198/813 |
| 3,561,553 | A | | 2/1971 | Blubaugh | .................. 177/168 |
| 4,411,327 | A | | 10/1983 | Lockery et al. | ............. 177/211 |
| 4,463,816 | A | | 8/1984 | MacFarlane | ................. 177/119 |
| 4,566,584 | A | | 1/1986 | Lindstrom | ................... 177/145 |
| 4,570,729 | A | | 2/1986 | Del Rosso | ................... 177/145 |
| 5,022,514 | A | * | 6/1991 | Lofberg | ....................... 198/813 |
| 5,294,756 | A | | 3/1994 | Lauber et al. | .............. 177/119 |
| 5,563,384 | A | | 10/1996 | Marlow et al. | ............... 177/50 |
| 5,670,752 | A | | 9/1997 | Nakajima | .................... 177/145 |
| 5,747,747 | A | | 5/1998 | Cadou et al. | ............... 177/145 |
| 6,509,533 | B1 | * | 1/2003 | Tanaka et al. | .............. 177/126 |
| 6,708,813 | B2 | * | 3/2004 | Takahashi | ................ 198/369.2 |

FOREIGN PATENT DOCUMENTS

| JP | 4-23727 | 4/1992 |
| JP | 6-74813 | 3/1994 |
| JP | 7-52115 | 6/1995 |
| JP | 2539002 | 4/1997 |

OTHER PUBLICATIONS

English language International Search Report dated Jun. 5, 2001.

* cited by examiner

*Primary Examiner*—Randy W. Gibson
(74) *Attorney, Agent, or Firm*—Staas & Halsey LLP

(57) ABSTRACT

A weighing conveyor having an increased weighing accuracy. This conveyor includes a conveyor apparatus 3 for transporting an article X to be weighed, a load detector 5 for detecting the weight of the article X to be weighed, and a housing 7 for accommodating the load detector 5, in which a fixed end 5b of the load detector is connected with the housing 7 and a free end 5c thereof is connected with a support member 120 for supporting the conveyor apparatus 3, and the support member 120 protrudes outwardly of the housing 7 from a bottom surface thereof.

17 Claims, 19 Drawing Sheets

CONVEYOR APPARATUS AND COMMODITY INSPECTING EQUIPMENT UTILIZING THE SAME

This application is a division of Ser. No. 10/009,832 filed Dec. 17, 2001 now U.S. Pat. No. 6,803,529, which is a 371 of PCT/JP01/03914 filed May 5, 2001.

FIELD OF THE INVENTION

The present invention relates to a conveyor apparatus and a commodity inspecting equipment equipped with such conveyor apparatus.

BACKGROUND ART

A commodity inspecting equipment such as a weighing conveyor for, while articles are successively transported by a conveyor apparatus in a production line, measuring the weight thereof includes, for example, a conveyor apparatus of a type in which an endless flat belt or the like is trained as a transport belt between a pair of rollers supported by a frame. One of the roller is a drive roller to which a driving force from a drive source such as a motor for moving the transport belt, and as a belt for transmission of the driving force an endless belt or the like is trained between a pulley, mounted coaxially on the drive roller, and a pulley mounted on a drive shaft of the drive source.

The conveyor apparatus is coupled with a free end side of an elastic element so that it can serve as a load to a load cell as a load detector. A fixed end side of the elastic element is coupled with a fixed member such as a leg member, a fixed frame, a fixed bracket or the like. The load cell is generally accommodated within a housing so that it will not be affected by an external environment such as moisture, dusts and others.

A relation in position between the conveyor apparatus and the housing is such that since a space above the conveyor apparatus is required to be open wide in view of articles to be weighed being placed on the conveyor apparatus and since measurements would result in an error when foreign matter falls onto the conveyor apparatus, the conveyor apparatus is generally disposed immediately above the housing or in side by side fashion relative to the housing. Accordingly, hitherto, the housing has an opening defined on a top surface or a side surface, and a support member for the support of the conveyor apparatus is passed through the opening so as to extend outwardly from the top surface or side surface of the housing. One end side of the support member is connected with the free end side of the elastic element, whereas the other end side thereof extends upwardly or laterally towards the conveyor apparatus, and the opening through which the support member extends is closed by a diaphragm.

In the meantime, this type of the weighing conveyor is sometimes used for transport and weighing of food materials and, in such case, a water component and/or dregs of the food materials may fall and/or scatter onto the housing to deposit on surfaces of the housing. However, if the top surface or side surface of the housing has the opening through which the support member extends and the diaphragm or the like, the dregs deposited thereon tend to easily accumulate, resulting in proliferation of unwanted bacteria to such an extent as to result in degradation of sanitary conditions and also to perforation in the diaphragm as a result of the dregs or the like having been bitten. Also, even where a cleaning work is regularly performed using a cleansing liquid or the like, a surface structure of the top surface or side surface of the housing is complicated, resulting in the cleaning capability of the opening, diaphragm and their surroundings being reduced.

As a technique capable of dealing with the foregoing problems, there is what is disclosed in the Japanese Laid-open Patent Publication No. 9-297051. This technique is such that while the load cell is accommodated within a housing, a member for connecting a fixed end portion of an elastic element to a fixed member external to the housing is passed from a lower surface of the housing to the outside. By so doing, neither the opening nor the diaphragm is positioned above the top surface or side surface of the housing, resulting in improvement in capability of being cleaned.

However, in the technique disclosed in the above mentioned publication, the fixed end portion of the elastic element is connected with the fixed member external to the housing and the free end portion is connected with the housing. Also, a support member is mounted on a surface of the housing and the conveyor apparatus is supported by the housing. Accordingly, in addition to the weight of the conveyor apparatus, the weight of the support member or the weight of a drive transmission mechanism, such as the drive motor, the drive transmitting belt and pulleys or the like, the weight of the housing is loaded on the load cell as a tare weight and, therefore, the tare weight tends to become heavy, accompanied by reduction in natural frequency of a measurement system of the weighing conveyor, which in turn results in lowering of the weighing accuracy.

Also, in this weighing conveyor, the drive shaft of the drive motor extend in a direction perpendicular to the direction in which the elastic element of the load cell displaces upon receipt of a load. For this reason, the direction in which a portion of the centrifugal force generated as a result of rotation of the drive shaft acts coincides with the above mentioned direction of displacement of the elastic element. Accordingly, there has been a problem in that a weight signal outputted from the load cell contains noises and, therefore, the weighing accuracy tends to be lowered.

On the other hand, since the load cell is downwardly loaded with a load of the articles by the effect of a gravitational force, the direction in which the elastic element displaces during a load detection lie in a direction up and down. In other words, hitherto, in this type of the weighing conveyor, a transport surface of the conveyor apparatus lies perpendicular to the direction of displacement of the elastic element and the longitudinal axis of the drive shaft of the drive source lie parallel to the transport surface of the conveyor apparatus.

In view of the foregoing, in the event that a centrifugal force is generated as a result of rotation of the drive shaft of the drive source, accompanied by the generation of vibration, a portion of the direction of the vibration induced by the centrifugal force acts also in a direction up and down. Since the up and down direction lie in the direction in which the elastic element of the load cell displaces during the load detection, a change in load brought about by the vibrations is detected by the load cell, with the consequence that the weight signal from the load cell contains noises, resulting in reduction of the weighing accuracy.

The more considerable the fluctuation of the drive shaft being driven, the more considerable the vibration brought about by the effect of the centrifugal force. In other words, in the event that the mass of the rotating element is in an unbalanced state with respect to the center of rotation thereof or the drive shaft fluctuate about the longitudinal axis thereof during rotation thereof, the noises tend to become paramount.

In order to alleviate the above discussed problems, a technique disclosed in, for example, the Japanese Laid-open Patent Publication No. 8-136330 may be employed. In other words, in addition to a first standard load cell displaceable up and down to detect the weight of an article to be weighed, a second load cell is used and operable to displace in a horizontal direction parallel to a direction of transport. This second load cell is used to detect a vibration acting in the transport direction as a result of rotation of a rotary element. Since the vibration generated therein is a centrifugal force, it has an equal magnitude in all directions within a plane perpendicular to a plane of transport. Accordingly, by subtracting the vibration detected by the second load cell from a weight signal detected by the first load cell after the phase relationship between them has been rectified, noises resulting from the vibration can be eliminated.

However, with the known technique, plural load cells are required and, accordingly, not only does a hardware aspect become complicated, but also a software aspect of a signal processing for processing the weight signal becomes complicated, resulting in disadvantages in terms of cost. In view of this, there is a need to simplify the structure enough to avoid reduction in weighing accuracy which would otherwise results from containment of noises in the weight signal outputted from a load detector as a result of a rotatory vibration of the drive source.

Also, in this type of weighing conveyor, since the load cell, the drive motor and the drive transmission mechanism are all disposed between upper and lower runs of the transport belt, the conveyor apparatus tends to have an increased size particularly a heightwise direction thereof. Accordingly, since the natural frequency of the weighing conveyor decreases as a result of increase of the weight of the conveyor apparatus, that is, the tare weight, a low pass filter having a high cutoff frequency, for example, cannot be used. For this reason, the response of the filter does not increase so much and a filter processing time does not decrease so much, and accordingly, a high speed weighing operation is hampered.

Accordingly, the present invention has been devised in view of the foregoing problems and is intended to increase the accuracy of inspection including the weighing accuracy. Hereinafter, the present invention will be described in detail, including the underlying problems.

DISCLOSURE OF THE INVENTION

In order to alleviate the foregoing problems, an inspecting machine according to a first aspect of the present invention is a weighing conveyor characterized in that it includes a conveyor apparatus for successively transporting articles to be weighed, a load detector for detecting a weight of the articles to be weighed that are successively transported by the conveyor apparatus, and a housing for accommodating the load detector, wherein a fixed end of the load detector is connected with the housing and a free end thereof is connected with a support member for supporting the conveyor apparatus, said support member protruding outwardly from a bottom surface of the housing.

According to the first aspect, since the support member for connecting the load detector, accommodated within the housing, and the conveyor apparatus together is so configured as to protrude outwardly from the bottom surface of the housing, neither from a top surface of the housing nor from a side surface thereof, there is no need to provide an opening and a diaphragm in the top or side surface of the housing for passage of the support member therethrough.

Also, since it is not the structure in which the support member is provided in the housing and the conveyor apparatus is supported by the housing, there is no need to assembly various members on a surface of the housing. Accordingly, the housing can have a surface neat in finish and with neither projection nor indentation and, therefore, any possible deposition, stay and biting of the dregs of the article to be weighted can be suppressed. Also, a cleaning work is easy to perform, resulting in increase of a cleaning capability.

Also, since the housing is connected with the fixed end of the elastic element, no weight of the housing will be added to a tare weight and the tare weight does not therefore increase, resulting in increase of the weighing accuracy.

In a preferred embodiment of the above described first aspect, the conveyor apparatus is arranged immediately above the housing and the supporting member after having protruded outwardly from the bottom surface of the housing extends upwardly of the housing towards the conveyor apparatus.

According to this embodiment, by causing the support member once extending downwardly from the housing is bent so as to extend upwardly, the conveyor apparatus can be disposed immediately above the housing as usual. As a result thereof, a space above the conveyor apparatus is left wide open and the possibility of foreign matter falling from the housing onto the conveyor apparatus is avoided and, as a result, the increase of the weighing accuracy can be expected.

In another preferred embodiment of the above described first aspect, a surface of the housing confronting the conveyor apparatus is defined by a downwardly continuously inclined face.

According to this embodiment, even though dregs and others of the article to be weighed that is transported by the conveyor apparatus falls or scatter and then deposit on a surface of the housing, they will slip downwardly without being stayed or stagnated. Accordingly, inconveniences such as degradation of the sanitary condition and/or proliferation of unwanted bacteria can advantageously be avoided.

In a further preferred embodiment of the above described first aspect, a drive source for driving the conveyor apparatus is accommodated within the housing.

According to this embodiment, since arrangement has been made that the drive source such as a motor for driving the conveyor apparatus is also accommodated within the housing, no separate second housing for accommodating the drive source is needed. Accordingly, the structure of the weighing conveyor as a whole can be simplified and this contributes to alleviation of the problem associated with deposition of the dregs and the cleaning capability.

Also, since electric lines or the like for the drive source do not expose themselves to the outside of the housing, this renders a surface shape to be neat and the problem associated with deposition of the dregs and the cleaning capability can be alleviated. In addition, the electric lines or the like need not be passed through the diaphragm to the outside and inside of the housing and, therefore, degradation of the water proof feature and the dust proof feature can be avoided.

In a still further preferred embodiment of the above described first aspect, a drive transmission mechanism for transmitting a driving force of the drive source to the conveyor apparatus is accommodated within the support member.

According to this embodiment, arrangement has been made that by the utilization of the support member the drive transmission mechanism such as the drive transmission belt and pulleys are accommodated therein, a possible deposition of the dregs on the drive transmission mechanism can be prevented. Also, no separate housing for accommodating the drive transmission mechanism need be prepared and the weighing conveyor as a whole can therefore be simplified, thereby lessening the problem associated with the deposition of the dregs and the cleaning capability.

A conveyor apparatus according to a second aspect of the present invention is characterized in that when a frame structure is bent, an endless transport belt can be mounted on or removed from at least one pair of rollers supported by the frame structure, wherein a bending fulcrum of the frame structure lies at a location on one side of a line of extension, connecting respective axes of rotation of the rollers together when the frame structure is not bent, adjacent one of runs of the transport belt, and wherein there is provided a stop member for inhibiting the frame structure from being bent towards the other of the runs of the transport belt.

According to this second aspect, since when the frame structure is not bent, the bending fulcrum of the frame structure does not lie on the line of extension connecting the respective axes of rotation of the rollers and lies on one side adjacent one of the belt runs, this frame structure when the frame structure is not bent is tended to necessarily bend towards the other of the belt runs under the influence of a resilient restoring force of the transport belt then held taut. At this time, bending of the frame structure towards the other of the belt runs is barred and, therefore, when this frame structure when not bent is maintained and locked in a condition in which it is not bent.

As a result thereof, no lock pins or the like such as dedicated to avoid bending of the frame structure need be prepared separately and the structure of the conveyor apparatus can be simplified, the number of the component parts used can be suppressed and the cleaning capability is increased, resulting in increase of the weighing accuracy. Also, when the transport belt is to be mounted and removed, there is no need to manipulate any lock pin or the like and bending and straightening of the frame structure are sufficient, thereby simplifying the mounting and removal of the transport belt.

In a preferred embodiment of the above described second aspect, the other of the runs of the transport belt is a transport surface for the articles to be weighed.

According to this embodiment, by the action of a reactive force of the gravity of the article being transported and a reactive force resulting from the tension of the transport belt, the frame structure tends to bend in a direction in which the bending thereof is barred. As a result thereof, any possible unlocking of the posture of the frame structure during the transport of the article can be avoided.

In another preferred embodiment of the above described second configuration, the rollers are rotatable to allow the other of the runs of the transport belt to be held under tension.

According to this embodiment, since the force with which the frame structure tends to bend towards the other of the runs of the belt becomes stronger, this leads to the firm maintenance and locking of the frame structure in the non-bending condition when the frame structure is not bent.

In a further referred embodiment of the above described second aspect, a biasing member is employed for biasing at least one of the rollers in a direction required for a distance between the rollers to increase.

According to this embodiment, since the transport belt is held assuredly under tension at all times, the resilient restoring force thereof can be secured and it is warranted that the frame structure is locked in the non-bending condition. Also, the tension of the belt and, hence, the resilient restoring force of the belt can be adjusted to variably adjust the force with which the frame structure tends to bend.

In a still further preferred embodiment of the above described second aspect, the transport belt is provided with indentations engageable with the rollers to regulate displacement in position in a direction widthwise thereof.

According to this embodiment, since any possible displacement in position in a widthwise direction of the transport belt can be regulated, a tortuous motion of the belt can be suppressed to allow the belt to be held stably under tension. As a result, the resilient restoring force of the transport belt can be secured and, therefore, this warrants the locking of the frame structure in the non-bending condition.

In a still further preferred embodiment of the above described second aspect, the frame structure is provided with roofing member for supporting the run of the transport belt from backside thereof and wherein the stop member is defined by the roofing members.

According to this embodiment, where the roofing members are employed for supporting the run of the transport belt from rear to prevent the transport belt from being slackened to thereby facilitate a smooth transport of the article, the stop member is concurrently served by the utilization of the roofing members and, therefore, not only can the structure be simplified, but also the number of the component parts needed can be suppressed.

It is to be noted that the roofing members are exclusively utilized to stabilize a posture of the article to be transported during the transport thereof. In the weighing conveyor, to allow the article to be transported past a sensor or the like serving as an inspecting means while the article is in a stabilized posture without being fallen down is important in realizing a stable and assured weighing operation of the weighing conveyor. In the weighing conveyor, it is because if the article (the article to be weighed) falls down on the transport conveyor during the transport thereof, a weighing error may occur. On the other hand, in the case of a foreign matter detecting system in which the article is transported by the conveyor apparatus the presence or absence of foreign matter such as metallic particles mixed into the article being transported is inspected magnetically or by the utilization of X rays, it will constitute an error in detection of the foreign matter.

A conveyor apparatus according to a third aspect of the present invention is of a type wherein when a frame structure is bent, an endless transport belt can be mounted on or removed from at least one pair of rollers supported by the frame structure, said conveyor apparatus comprising a drive source for driving one of the rollers; a pulley mounted on a drive shaft of the drive source; a pulley mounted coaxial with one of the rollers; an endless drive transmitting belt trained between and around the pulleys, wherein a bending fulcrum of the frame structure lies at a location on one side of a line of extension of respective axes of rotation of the pulleys, when the frame structure is not bent, adjacent one of runs of the drive transmitting belt; and a stop member for inhibiting the frame structure from being bent towards the other of the runs of the drive transmitting belt.

According to this third aspect, in place of or in combination with the resilient restoring force of the transport belt trained between and around the rollers, and under the influence of the resilient restoring force of the drive transmission belt for transmitting the drive of the drive motor to the drive roller, the frame structure tends to bend towards the other of the belt runs. Accordingly, so long as the frame structure is not bent, the condition in which they do not bend is firmly maintained and is thus locked. Since the article to be weighed that is placed on the transport belt can accordingly be transported in a stable posture, the weighing accuracy can be increased.

Also, when the frame structure is bent, mounting and removal of the transport belt can be performed simultaneously with mounting and removal of the drive transmission belt, respectively.

An article inspecting machine according to a fourth aspect of the present invention is equipped with the conveyor apparatus according to the above described second aspect.

In a preferred embodiment of the above described fourth aspect, there is provided an engagement for supporting a conveyor apparatus when engaged with the conveyor apparatus, and wherein the conveyor apparatus and the engagement are engaged with each other when a frame structure of the conveyor apparatus is not bent, but are disengaged from each other when the frame structure of the conveyor apparatus is bent.

According to this embodiment, when the frame structure of the conveyor apparatus is extended to a straight shape, mounting of the transport belt onto the conveyor apparatus and mounting of the conveyor apparatus onto the inspecting machine can be performed simultaneously. Also, when the frame structure of the conveyor apparatus is bent, removal of the transport belt from the conveyor apparatus and removal of the conveyor apparatus from the inspecting machine can also be performed simultaneously.

As a result thereof, there is no need to use separately any fixture or the like dedicated for use in installing the conveyor apparatus onto the inspecting machine and, therefore, not only can the structure of the article inspecting machine be simplified, but also the number of component parts needed can be suppressed to facilitate cleaning and to suppress any reduction in weighing accuracy. Also, when the conveyor apparatus is to be removed, there is no need to manipulate any fixture or the like and selective straightening or bending of the frame structure of the conveyor apparatus is sufficient and, thus, the operation to remove the conveyor apparatus can be simplified. In other words, the maintenance and the cleaning capability can be considerably increased.

An inspecting machine according to a fifth aspect of the present invention is a weighing conveyor for weighing a weight of an article to be weighed while the article to be weighed is transported, which weighing conveyor is characterized by including a conveyor apparatus for transporting the article to be weighed and having a transport surface laid horizontally; a drive source for driving the conveyor apparatus, and a load detector for supporting the conveyor apparatus and the drive source and for detecting the weight of the article to be weighed that is supported and transported by the conveyor apparatus, in terms of up and down displacement thereof, an axis of rotation of the drive source being arranged parallel to a direction of such displacement.

In a preferred embodiment of the above described fifth aspect, the drive source is arranged on a free end of the load detector.

Also, in another preferred embodiment of the above described fifth aspect, a drive transmission mechanism for transmitting a driving force of the drive source to the conveyor apparatus is employed, whereby an axis of a rotatory drive force generated by the drive source is converted into a direction parallel to the transport surface by the drive transmission mechanism.

The weighing apparatus according to the present invention is characterized in that it is equipped with the weighing conveyor according to the above described fifth aspect. This weighing conveyor can be optimally used particularly as a weighing apparatus (a weight checker).

According to the above described fifth aspect, where the transport surface of the conveyor apparatus lie perpendicular to the direction of displacement of the load detector, the axis of rotation of the drive source is rendered to be parallel to the direction of displacement, not parallel to the transport surface. In other words, the drive source is so disposed that the axis of rotation of the drive source can lie parallel to the direction of displacement of the load detector.

By so designing, the direction in which the rotational vibration of the drive shaft of the drive source acts and the direction of displacement of the load detector lie perpendicular to each other without coinciding with each other. Accordingly, it is possible to prevent the load detector from detecting vibration noises and, therefore, no extra external noises will not appear in the weight signal, thereby increasing the weighing accuracy.

Also, since the drive source is merely disposed so that the drive shaft of the drive source can extend in a direction parallel to the direction of displacement of the load detector, the hardware structure will not be complicated. Also, the weight signal can be used by itself and, therefore, no software structure of a signal processing is not complicated as well. In addition, since the transport surface is disposed horizontally, as compared with the type in which, for example, a pair of transport surfaces are laid vertically in face-to-face relation with each other with the article to be weighed being transported while sandwiched between the transport surfaces, a diversity of articles to be weighed can be transported.

Also, as the drive source, which is a major source of drive noises and which is a heavy item is disposed adjacent the free end of the load detector, the center of gravity of the drive source approaches the center of moment of the load detector and, therefore, the influence which would be brought about by an external disturbing noises to the load detector can be reduced. Moreover, even though the drive source which is the source of the drive noises exists at the free end, the load detector would not adversely affected by the drive noises since the direction in which the vibration acts is different from the direction of detection of the load detector.

In addition, where the drive transmission mechanism for transmitting the drive force of the drive source to the conveyor apparatus is employed so that by this drive transmission mechanism the axis of rotational drive force generated by the drive source can be converted into a direction parallel to the transport surface, the drive force of the drive source can be assuredly transmitted to the conveyor apparatus while the direction in which the axis of the rotational drive force generated by the drive source is properly corrected by the drive transmission mechanism.

In other words, since the axis of rotation of the drive source is laid parallel to the direction of displacement of the load detector, the axis of the rotational drive force initially generated by the drive source and the transport surface of the conveyor apparatus lie perpendicular to each other and do not therefore coincide with each other. Accordingly, by converting the axis of the rotational drive force into the direction parallel to the transport surface of the conveyor apparatus by the utilization of the drive transmission mechanism that is disposed between the drive source and the conveyor apparatus, a smooth drive transmission can be realized. By employing such structure, it is possible to realize versatile transport.

An inspecting machine according to a sixth aspect of the present invention is a weighing conveyor for weighing a weight of an article to be weighed while the article to be weighed is transported, which weighing conveyor is characterized by including a conveyor apparatus for transporting the article to be weighed; a drive source for driving the conveyor apparatus; a drive transmitting mechanism for transmitting a drive force of the drive source to the conveyor apparatus; and a load detector for supporting the conveyor apparatus, the drive source and the drive transmitting mechanism and for detecting the weight of the article to be weighed that is supported and transported by the conveyor apparatus, wherein the conveyor apparatus is disposed above the load detector, the drive source is disposed at a location substantially level with the load detector, or below the load detector, with respect to an up and down direction, and the drive transmission mechanism is disposed so as to extend between a position below the load detector and a position above the load detector with the load detector intervening therebetween, such that a composite center of gravity of the conveyor apparatus, the drive source and the drive transmission mechanism is brought to a position in a vicinity of a center of moment of the load detector in the up and down direction.

An inspecting machine according to a seventh aspect of the present invention is a weighing conveyor for weighing a weight of an article to be weighed while the article to be weighed is transported as is the case with the sixth aspect, which weighing conveyor is characterized by including a conveyor apparatus for transporting the article to be weighed; a drive source for driving the conveyor apparatus; a drive transmitting mechanism for transmitting a drive force of the drive source to the conveyor apparatus; and a load detector for supporting the conveyor apparatus, the drive source and the drive transmitting mechanism and for detecting the weight of the article to be weighed that is supported and transported by the conveyor apparatus, wherein the conveyor apparatus is disposed below the load detector, the drive source is disposed at a location substantially level with the load detector with respect to an up and down direction, and the drive transmission mechanism is disposed so as to extend between a position below the load detector and a position above the load detector with the load detector intervening therebetween, such that a composite center of gravity of the conveyor apparatus, the drive source and the drive transmission mechanism is brought to a position in a vicinity of a center of moment of the load detector in the up and down direction.

An inspecting machine according to an eighth aspect of the present invention is a weighing conveyor for weighing a weight of an article to be weighed while the article to be weighed is transported as is the case with the sixth aspect, which weighing conveyor is characterized by including a conveyor apparatus for transporting the article to be weighed; a drive source for driving the conveyor apparatus; a drive transmitting mechanism for transmitting a drive force of the drive source to the conveyor apparatus; and a load detector for supporting the conveyor apparatus, the drive source and the drive transmitting mechanism and for detecting the weight of the article to be weighed that is supported and transported by the conveyor apparatus, wherein the load detector is arranged at a location substantially intermediate of the conveyor apparatus with respect to a direction of transport of the article to be weighed, the drive source is arranged adjacent the load detector and the drive transmission mechanism is arranged so as to extend between a position downstream of the direction of transport and a position upstream of the direction of transport with the load detector intervening therebetween, such that a composite center of gravity of the conveyor apparatus, the drive source and the drive transmission mechanism is brought to a position in a vicinity of a center of moment of the load detector in the transport direction.

An inspecting machine according to a ninth aspect of the present invention is a weighing conveyor for weighing a weight of an article to be weighed while the article to be weighed is transported as is the case with the sixth aspect, which weighing conveyor is characterized by including a conveyor apparatus for transporting the article to be weighed; a drive source for driving the conveyor apparatus; a drive transmitting mechanism for transmitting a drive force of the drive source to the conveyor apparatus; and a load detector for supporting the conveyor apparatus, the drive source and the drive transmitting mechanism and for detecting the weight of the article to be weighed that is supported and transported by the conveyor apparatus, wherein the load detector is arranged substantially intermediate of the conveyor apparatus with respect to a transport widthwise direction of the article to be weighed, the drive source is arranged at a location substantially level with the load detector with respect to the transport widthwise direction, and the drive transmission mechanism is arranged so as to extend between a position substantially level with the load detector and a position leftwards or rightwards of the transport widthwise direction, or so as to extend between respective positions leftwards and rightwards of the transport widthwise direction with the load detector intervening therebetween, such that a composite center of gravity of the conveyor apparatus, the drive source and the drive transmission mechanism is brought to a position in a vicinity of a center of moment of the load detector in the transport widthwise direction.

In a preferred embodiment of the sixth aspect, the load detector is arranged substantially intermediate of the conveyor apparatus with respect to the direction of transport of the article to be weighed, the drive source is positioned adjacent the load detector, and the drive transmission mechanism is arranged so as to extend between respective positions upstream and downstream of the direction of transport with the load detector intervening therebetween, such that the composite center of gravity of the conveyor apparatus, the drive source and the drive transmission mechanism is brought to the position in the vicinity of the center of moment of the load detector also in the direction of transport.

In another preferred embodiment of the sixth aspect, the load detector is arranged substantially intermediate of the conveyor apparatus with respect to the transport widthwise direction, the drive source is positioned at a location substantially level with the load detector with respect to the transport widthwise direction, and the drive transmission mechanism is arranged so as to extend between a location substantially level with the load detector with respect to the transport widthwise direction and a location leftward or rightward of the transport widthwise direction, or so as to extend between respective locations leftwards and rightwards of the transport widthwise direction with the load detector intervening therebetween, such that the composite center of gravity of the conveyor apparatus, the drive source and the drive transmission mechanism is brought to the position in the vicinity of the center of moment of the load detector also in the transport widthwise direction.

The weighing apparatus of the present invention is featured in that the weighing conveyor according to the sixth aspect is employed. This weighing conveyor is most suitably used particularly as a weighing apparatus (a weight checker).

In the weighing conveyor according to any one of the previously described sixth to ninth aspects, since arrangement of the conveyor apparatus, the drive source and the drive transmission mechanism relative to the load detector is comprehensively taken into consideration and the weights are uniformly balances, the center of gravity of the weighing conveyor is positioned in the vicinity of the center of moment of the load detector.

Accordingly, the center-to-center distance between the center of gravity of the conveyor apparatus and the center of moment of the load detector can be reduced to minimize the force of moment acting on the load detector. As a result thereof, the frequency region of the noise component to be removed can be increased to reduce the filter processing time and, therefore, a high speed weighing operation can be attained to thereby increase the weighing accuracy.

Also, particularly in the weighing conveyor according to the sixth aspect, when the drive transmission mechanism is to be disposed between the conveyor apparatus, positioned above the load detector, and the drive source positioned at a location substantially level with the load detector or below the load detector, and when the drive transmission mechanism is disposed so as to extend up and down with the load detector intervening therebetween, the weights in the up and down direction of the conveyor apparatus can be balanced and the center of gravity of the conveyor apparatus can be brought close to the center of moment of the load detector with respect to the up and down direction.

In the weighing conveyor according to the seventh aspect, when the drive transmission mechanism is to be disposed between the conveyor apparatus, positioned below the load detector and the drive source arranged at a location substantially level with the load detector, the drive transmission mechanism is so arranged as to extend up and down with the load detector intervening therebetween. Accordingly, the weights in the up and down direction of the conveyor apparatus are well balanced and the center of gravity of the conveyor apparatus can be brought close to the center of moment of the load detector with respect to the up and down direction.

Also, in the weighing conveyor according to the eighth aspect, when the drive transmission mechanism is to be disposed between the conveyor apparatus, which has been disposed with its weight balanced in the transport direction relative to the load detector, and the drive source arranged at a location close to the load detector, the drive transmission mechanism is so arranged as to extend in a direction parallel to the transport direction with the load detector intervening therebetween. Accordingly, the weights in the transport direction of the conveyor apparatus are well balanced and the center of gravity of the conveyor apparatus can be brought close to the center of moment of the load detector with respect to the transport direction.

Again, in the weighing conveyor according to the ninth aspect, when the drive transmission mechanism is to be disposed between the conveyor apparatus, which has been disposed with its weight balanced in the transport widthwise direction relative to the load detector, and the drive source arranged at a location substantially level with the load detector in the transport widthwise direction, the drive transmission mechanism is so arranged as to extend between the position substantially level with the load detector in the transport widthwise direction and the position either leftwards or rightwards thereof or as to extend in a direction parallel to the transport widthwise direction with the load detector intervening therebetween. Accordingly, the weights in the transport widthwise direction of the conveyor apparatus are well balanced and the center of gravity of the conveyor apparatus can be brought close to the center of moment of the load detector with respect to the transport widthwise direction.

Furthermore, in a preferred embodiment of the weighing conveyor according to the sixth aspect, the center of gravity of the conveyor apparatus is brought in the close vicinity of the center of moment of the load detector in two dimensions including the up and down direction and the transport direction. Hereinafter, the preferred embodiments of the present invention, including their underlying problems will be discussed in detail with reference to the accompanying drawings.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODES FOR CARRYING OUT THE INVENTION

Figure 1:
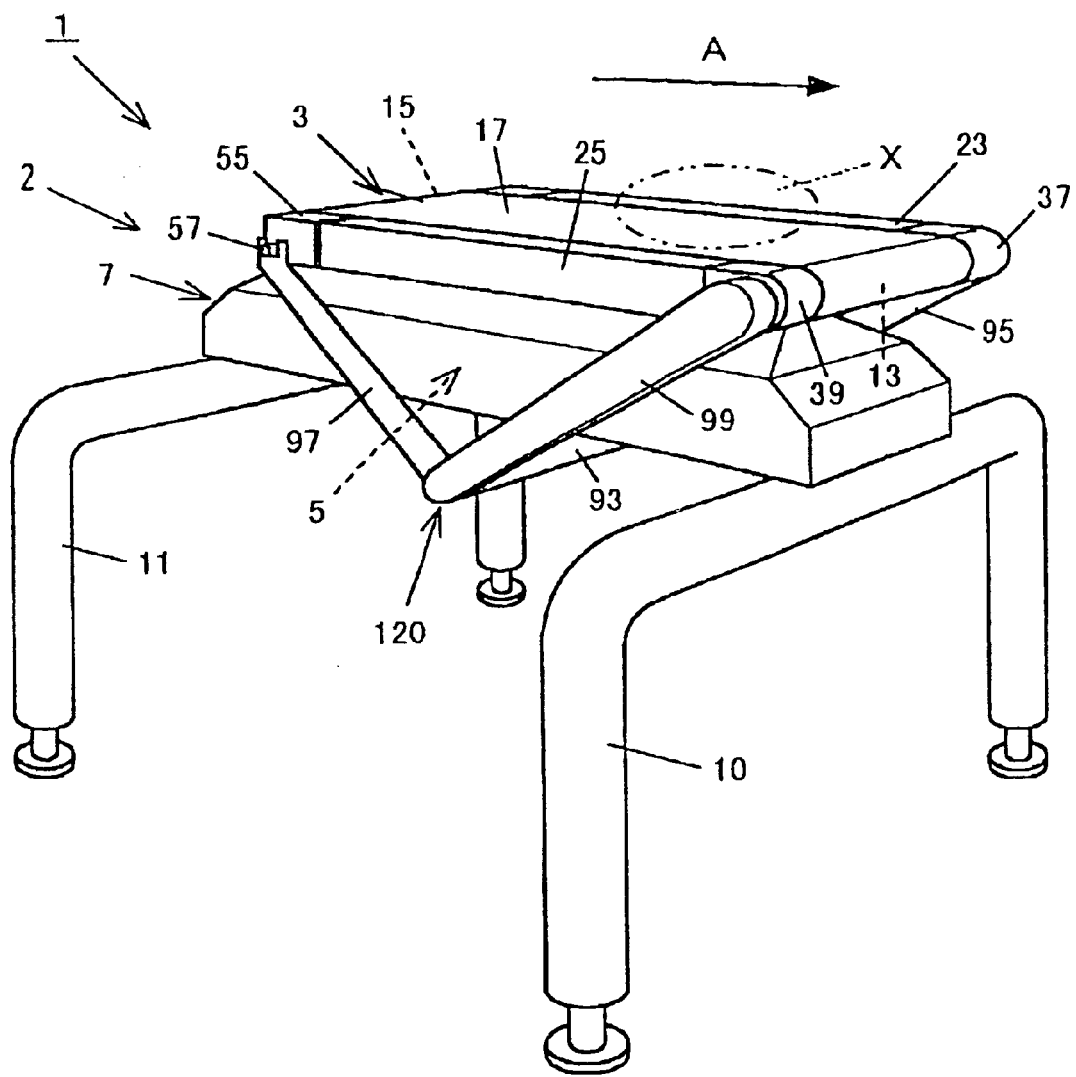
FIG. 1 is a schematic perspective view of a weighing apparatus utilizing a weighing conveyor according to the present invention.

Hereinafter, a weighing conveyor according to a first aspect of the present invention will be described. In an embodiment shown in FIG. 1, a weighing conveyor 2 is applied to a weight checker 1 which is a weighing apparatus. This weighing conveyor 2 includes a conveyor apparatus 3 of a flat belt type, and a housing 7 accommodating therein a load cell 5 serving as a load detector. The housing 7 is fixed on a pair of front and rear leg members 10 and 11. The weighing conveyor 2 is disposed at a tail end of a production line and is operable, for example, to measure, one at a time, the weight of bagged products X which are articles to be weighed and which are supplied from a bagging and packaging machine (not shown), while the bagged products X are successively transported by the conveyor apparatus 3 in a direction shown by the arrow A, and then to deliver the bagged products X successively onto, for example, a metal detector (not shown) or the like.

Figure 2:
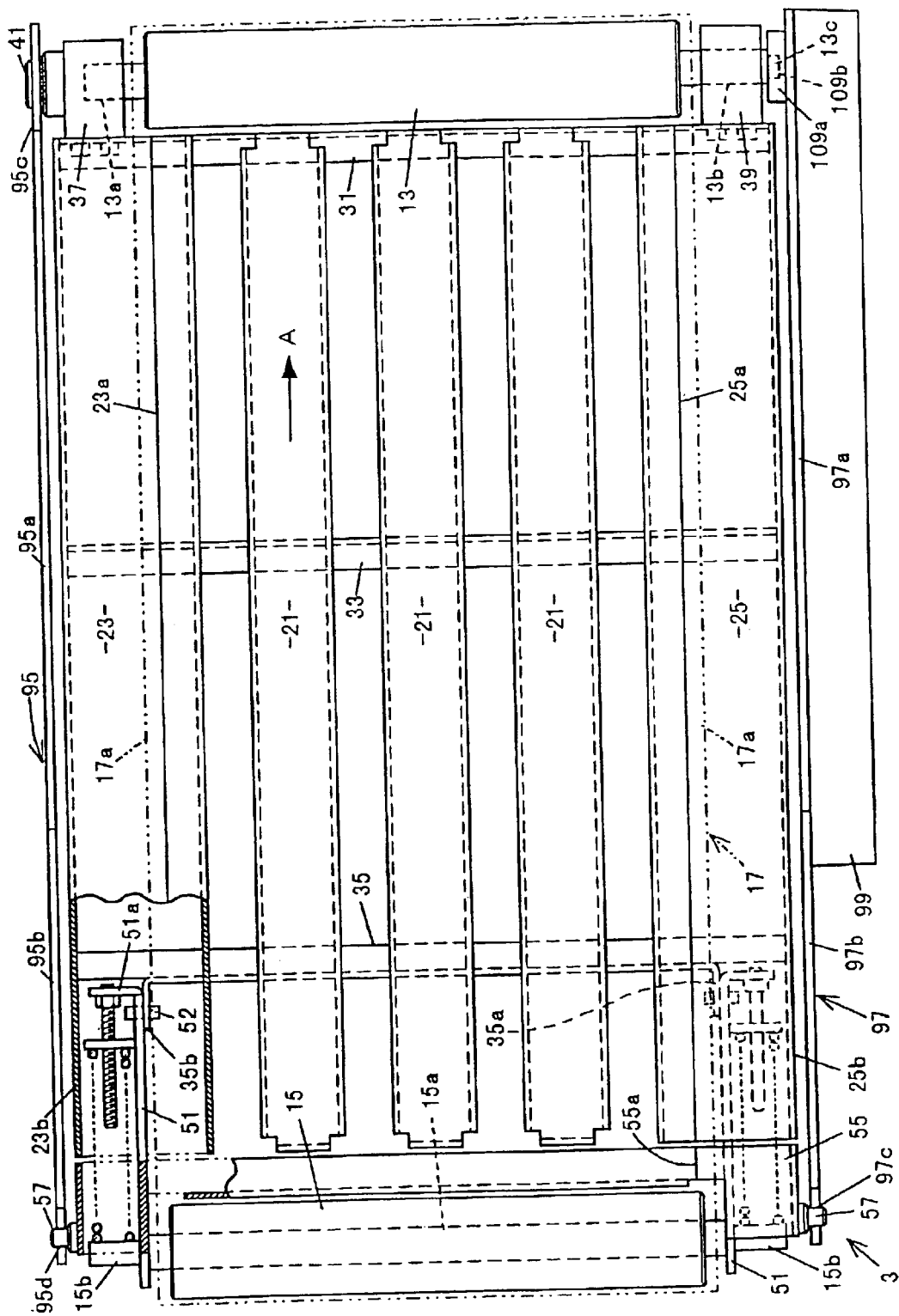
FIG. 2 is a top plan view showing the weighing conveyor with a portion of a conveyor apparatus removed.

As shown in FIG. 2, the conveyor apparatus 3 is of a structure including an endless flat belt 17 trained between and around front and rear rollers 13 and 15. The roller (front roller) 13 positioned downstream with respect to the transport direction A is a drive roller whereas the roller (rear roller) 15 positioned upstream with respect to the transport direction A is a driven roller. Positioned between these rollers 13 and 15 are five separated roofing plates 21 . . . 21, 23 and 25.

Those roofing plates 21 . . . 21, 23 and 25 are elongated in forward and rearward direction and are juxtaposes in side by side relation to each other. The three inner roofing plates 21 . . . 21 are positioned immediately below an upper run of the transport belt 17 that defines a transport surface thereof, to support the transport surface in its entire surface from below. The left and right roofing plates 23 and 25 are positioned sidewise adjacent opposite ends of the rollers 13 and 15, respectively, to partially support opposite side edge portions of the transport surface of the transport belt 17.

Figure 5:
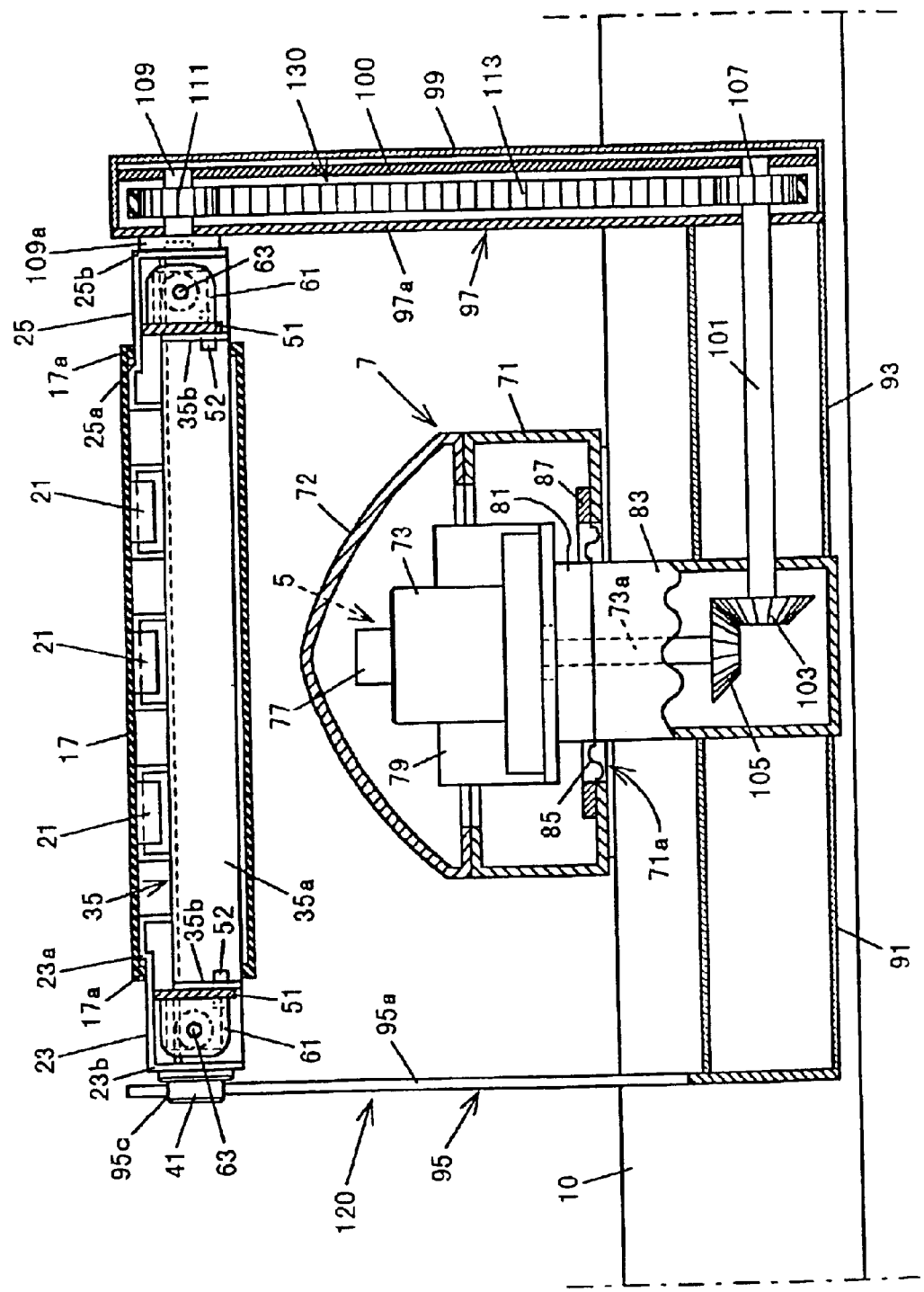
FIG. 5 is a longitudinal sectional view of the weighing conveyor, as viewed from an upstream side towards a downstream side.
Figure 7:
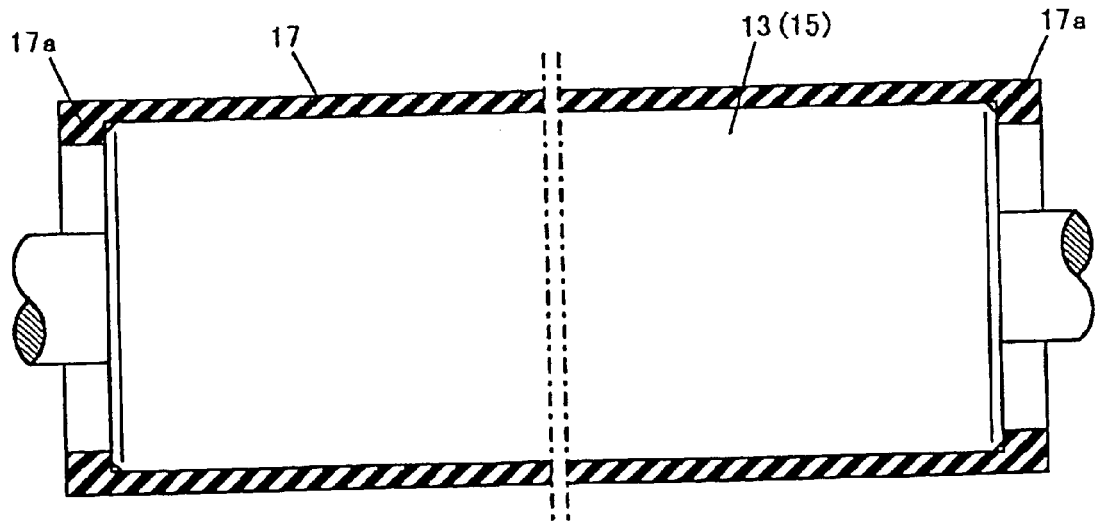
FIG. 7 is a sectional view, on an enlarged scale, showing an engagement between a transport belt and a roller.

The transport belt 17 has a width somewhat greater than the length of each of the rollers 13 and 15 and, as shown by 17a in FIGS. 5 and 7, left and right side edge portions of the transport belt 17 have their undersurfaces protruding outwardly. These protruding edge portions (indented) 17a and 17a are engaged with the opposite ends of each of the rollers 13 and 15, respectively. In this way, the transport belt 17 does not undergo a tortuous run in a direction widthwise thereof, which would otherwise result in when the transport belt 17 displace sidewise having been disengaged form one or both of the rollers 13 and 15, and is properly and stably trained between and around the rollers 13 and 15 at all times.

It is to be noted that the outer roofing plate 23 and 25 have their top surfaces formed with respective steps 23a and 25a for avoiding the adjacent protruding edge portions 17a and 17a of the transport belt 17.

Figure 3:
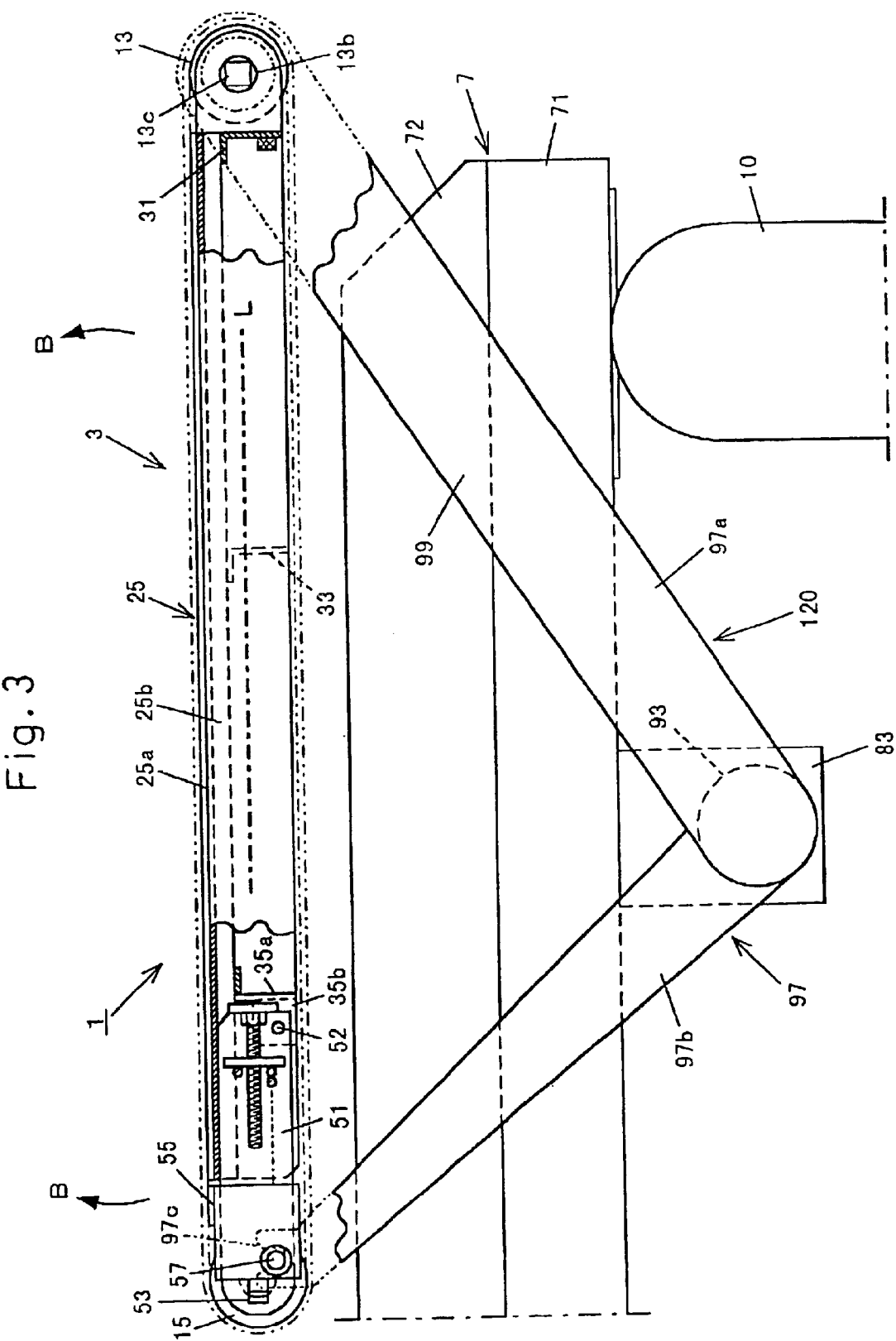
FIG. 3 is a left side view showing the weighing conveyor with a portion thereof cut out.
Figure 4:
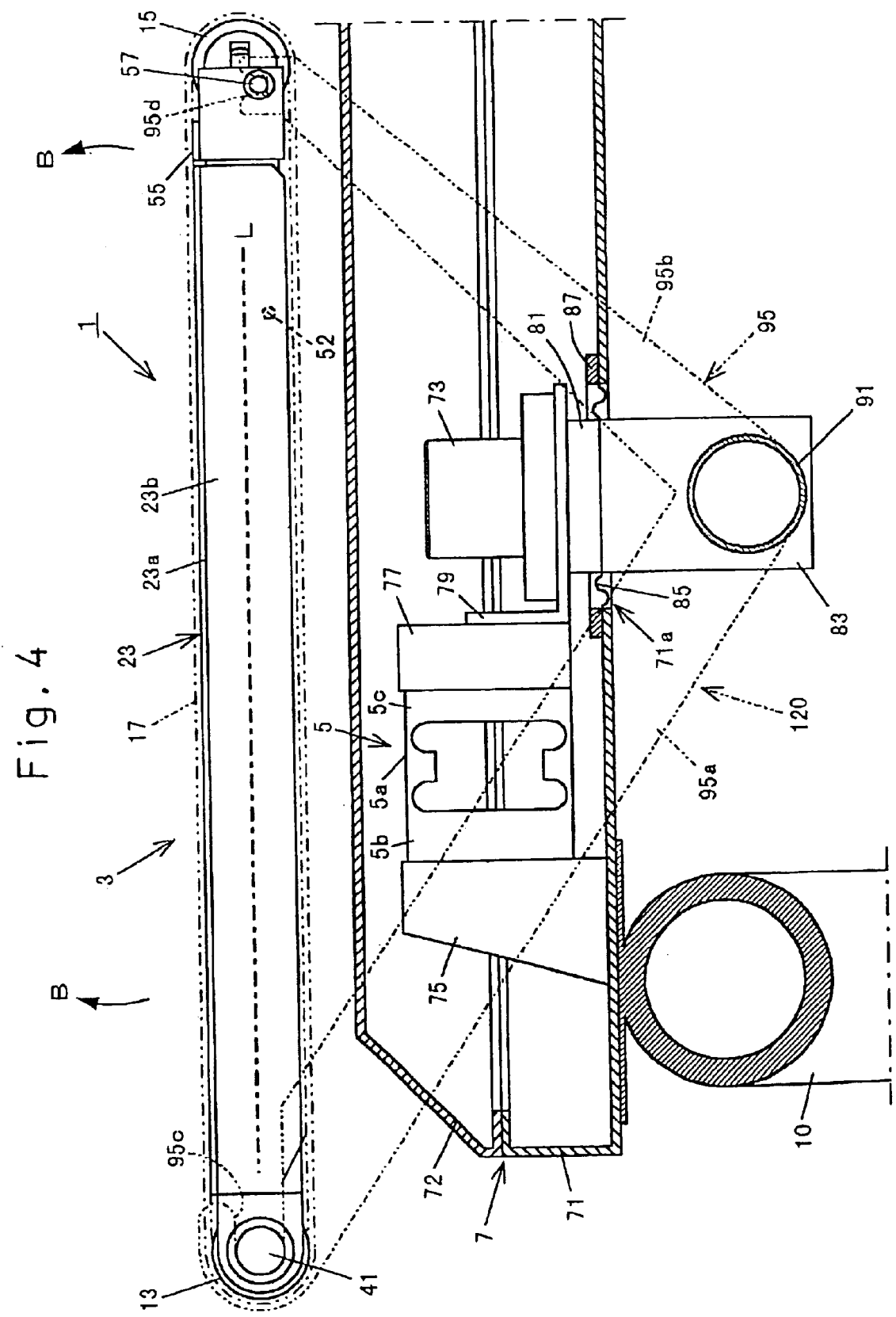
FIG. 4 is a right side view of the weighing conveyor, showing a structure inside a housing in a fragmentary sectional representation.

As shown in FIG. 5, each of the roofing plates 21 . . . 21, 23 and 25 is so bent and so shaped as to represent a generally channel shaped cross section. These roofing plates 21 . . . 21, 23 and 25 are, as shown in FIG. 2, connected together by means of three L-sectioned beams 31, 33 and 35. As shown in FIGS. 3 to 5, the left and right roofing plates 23 and 25 have respective outer longitudinal walls 23b and 25b that extend a substantial distance in a direction up and down to thereby define left and right side walls of the conveyor apparatus 3.

As shown in FIG. 2, the drive roller 13 positioned downstream has stud shafts 13a and 13b protruding axially outwardly from the opposite ends thereof for rotation together therewith. Bearing units 37 and 39 are fitted to a longitudinal wall of the L-sectioned beam 31 that is positioned on the downstream side and the stud shafts 13a and 13b are rotatably supported respectively by these bearing units 37 and 39.

One 13a of the stud shafts is accommodated within the corresponding bearing unit 37. This bearing unit 37 has an outer surface formed with an engagement member 41 protruding outwardly therefrom. In contrast, the other 13b of the stud shafts extends through the corresponding bearing unit 39. The bearing unit 39 has an outer surface from which a free end 13c of the stud shaft 13b extending therethrough protrudes outwardly. As shown in FIG. 3, the outwardly protruding end 13c of the stud shaft 13b is so shaped as to have a rectangular cross section.

The left and right roofing plates 23 and 25 serve not only to support the transport surface of the transport belt 17 from rear, but also to provide left and right frames for the conveyor apparatus 3. In other words, the drive roller 13 is rotatably supported by the respective frames 23 and 25 through the bearing units 37 and 39 and the L-sectioned beam 31.

Figure 6:
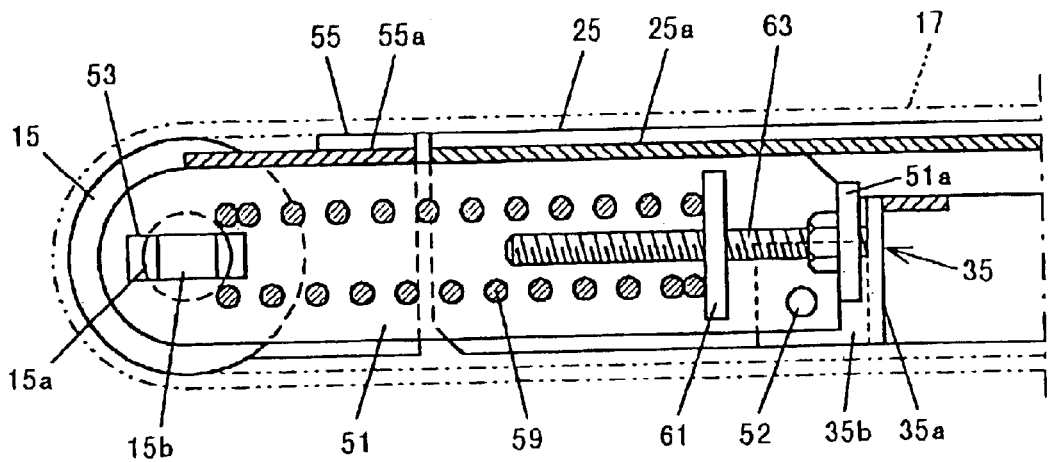
FIG. 6 is a side view, on an enlarged scale, showing a support structure for a driven roller of the conveyor apparatus of the weighing conveyor.

On the other hand, as shown in FIG. 2, left and right end portions of the longitudinal wall 35a of the upstream L-sectioned beam 35 are bent to extend in an upstream direction to provide respective bent pieces 35b and 35b to which brackets 51 and 51 are connected for pivotal movement about pin members 52 and 52, respectively. As shown in FIG. 6, each of the brackets 51 has an upstream side end representing a semicircular shape, and a slot 53 extending in a forward and rearward direction is defined in that upstream side end of the respective bracket 51. Opposite free ends 15b and 15b of a shaft 15a of the driven roller 15 are passed through the respective slots 53 and 53.

As shown in FIG. 6, the free ends 15b and 15b of the shaft 15a are so shaped as to have a rectangular cross section and are not therefore rotatable within the associated slots 53 and 53, but are displaceable in the forward and rearward direction within those slots 53 and 53. As shown in FIG. 2, the shaft 15a extends axially through the driven roller 15 which is in turn rotatable relative to the shaft 15a.

The pair of the left and right brackets 51 and 51 referred to above serve as frames of the conveyor apparatus 3. In other words, the driven roller 15 is supported rotatably by those frames 51 and 51.

As shown in FIG. 2, a roofing plate 55 is jointed to respective top edges of the brackets 51 and 51. This roofing plate 55 extends a distance in a widthwise direction and has engagement members 57 and 57 formed in left and right outer longitudinal walls thereof (See, also, FIGS. 3 and 4).

It is to be noted that as is the case with the left and light outer roofing members 23 and 25 discussed hereinbefore, a step 55a is formed on a top surface of the roofing member 55 to avoid the protruding edge portions 17a and 17a at the undersurface of the transport belt 17 (See, also, FIG. 6).

As shown in FIG. 6, each of the brackets 51 is provided with a respective spring 59, which is a biasing member for urging the shaft 15a of the driven roller 15 in an upstream direction and which has one end in abutment with the corresponding rectangular sectioned end 15b of the shaft 15a. The opposite end of the respective spring 59 is held in abutment with a plate member 61. The plate member 61 is in turn threadedly engaged with a screw rod 63. The screw rod 63 is rotatably supported by a bent piece 51a of each of the brackets 51 and 51.

As shown in FIG. 5, each of the plate members 61 and 61 has one side held in contact with the adjacent bracket 51. Accordingly, when the screw rod 63 is rotated, the plate member 61 moves forwards or rearwards. As a result, the biasing force generated by the corresponding spring 59 can be adjusted to thereby adjust a pressing force pressing the driven roller 15 in the upstream direction. In other words, the distance between the drive roller 13 and the driven roller 15 can be adjusted variably. The driven roller 15 is held still at a position in equilibrium with the tension of the transport belt 17. Accordingly, even though the length of the transport belt 17 fluctuates, it is possible for the transport belt 17 to be held properly under a proper tension at all times.

Also, as shown in FIGS. 4 and 5, the housing 7 has a structure and an appearance in which a housing body 71 occupying a lower half thereof and a covering member 72 occupying an upper half thereof and placed above the housing body 71. Within the housing 7, an elastic element 5a of the load cell 5, which is a load detector, and a drive motor 73, which is a drive source of the conveyor apparatus 3, are accommodated.

As shown in FIG. 4, the elastic element 5a has a stationary end 5b fixed to the housing body 71 through a fixing member 75. A free end 5c of the elastic element 5a has the drive motor 73 assembled thereto through a fixing member 77 and a bracket 79.

As shown in FIG. 5, the drive motor 73 is disposed with its drive shaft 73a extending in the up and down direction. In particular, in the illustrated embodiment, the drive shaft 73a of the drive motor 73 extends downwards. A hollow spacer 81 is fitted to an undersurface of the bracket 79, and a gear box 83 is in turn coupled to a lower end of the spacer 81.

The gear box 83 extends through an opening 71a defined in a bottom surface of the housing body 71 so as to protrude outwardly downwardly from the housing 7. A diaphragm 85 is interposed between respective joint faces of the spacer 81 and the gear box 83. This diaphragm 85 is also sandwiched between a peripheral lip region of the opening 71a and a ring member 87 secured to such peripheral lip region to thereby close the opening 71a.

As shown in FIGS. 3 to 5, cylindrical hollow members 91 and 93 extend horizontally from left and right side surface of the gear box 83, respectively. Of them, the cylindrical hollow member 91 extending towards the engagement members 41 and 57 secured to a side surface of the conveyor apparatus 3 so as to project therefrom has an extended end to which, as shown in FIGS. 4 and 5, an arm member 95 of a generally V-shaped configuration as viewed from side is fitted (See, also, FIG. 2). This arm member 95 is made up of arms 95a and 95b that extend slantwise upwardly in respective directions away from each other, respective free ends of those arms 95a and 95b having recesses 95c and 95d formed therein for receiving the associated engagement members 41 and 57 of the conveyor apparatus 3.

On the other hand, as regards the cylindrical hollow member 93 extending towards the engagement member 57 and the rectangular sectioned end 13c of the stud shaft 13b of the drive roller 13, both of which are secured to the side surface of the conveyor apparatus 3, an arm member 97 of a generally V-shaped configuration as viewed from side is fitted to an extended end of the cylindrical hollow member 93 as shown in FIGS. 3 and 5 (See, also, FIG. 2). This arm member 97 is made up of arms 97a and 97b that extend slantwise upwardly in respective directions away from each other, only the arm 97b having a free end formed with a cutout 97c for engagement with the engagement member 57 of the conveyor apparatus 3.

In contrast thereto, the arm 97a extending towards the end 13c of the stud shaft 13b has an outer surface to which an elongated cover member 99 is fitted, as shown in FIG. 5, to thereby define a sealed small room for accommodating a support plate 100 therein.

As shown in FIG. 5, the cylindrical hollow member 93 referred to above accommodates therein a transmission shaft 101 having one end mounted with a bevel gear 103 that is in turn meshed with a bevel gear 105 mounted fixedly on the drive shaft 73a of the drive motor 73. The transmission shaft 101 in turn extends into the interior of the cover member 99 and is then rotatably supported by the support plate 100 or the like. Within the interior of the cover member 99, a transmission pulley 107 is mounted on the transmission shaft 101 for rotation together therewith.

On the other hand, as shown in FIG. 5, a second transmission shaft 109, which is a rotary shaft, is rotatably supported by an upper portion of the support plate 100 at a location corresponding to the stud shaft 13b of the drive roller 13, and a second transmission pulley 111 is fixedly mounted on such shaft 109. An endless timing belt 113 for transmission of a drive force is trained between and around the transmission pulleys 107 and 111.

Figure 8:
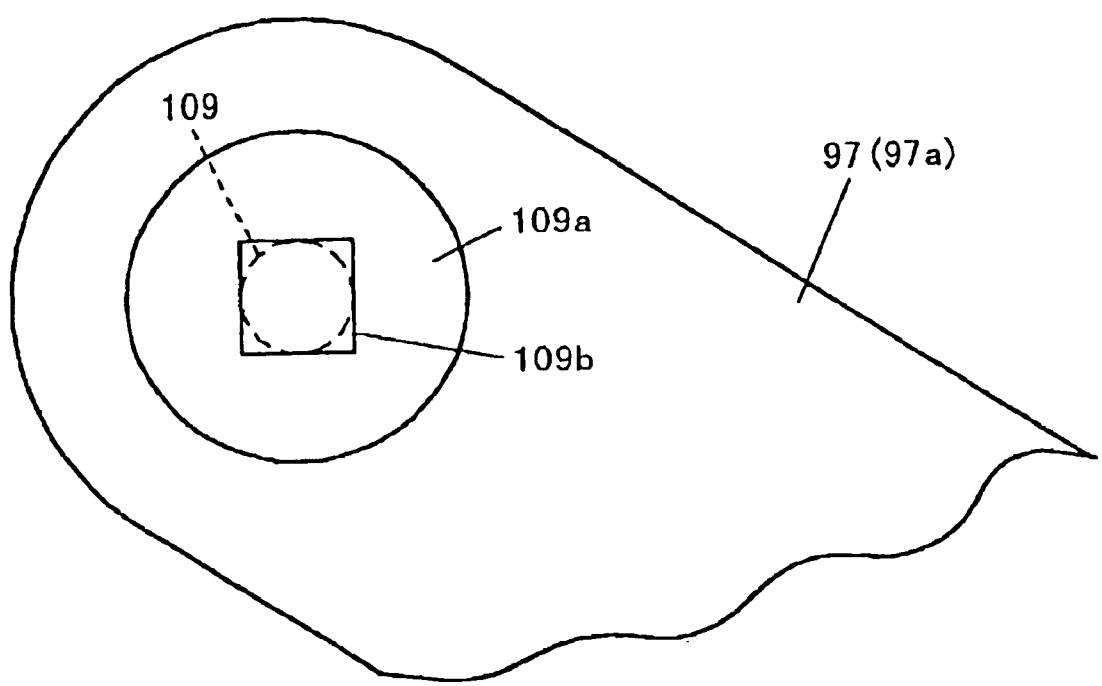
FIG. 8 is a fragmentary view, on an enlarged scale, showing an inner surface of an upper end of an arm forming a part of a support member.

It is to be noted that the second transmission shaft 109 extends through the arm 97a of the V-shaped arm member 97 inwardly towards the conveyor apparatus 3 and, as shown in FIG. 8, an extended portion 109a thereof is formed with a rectangular hole 109b formed therein for receiving the rectangular sectioned end 13c of the stud shaft 13b of the drive roller 13 (See, also, FIG. 2).

As discussed above, the spacer 81, the gear box 83, the horizontally extending cylindrical hollow members 91 and 93, and the left and right V-shaped arm members 95 and 97 and others are not only support the conveyor apparatus 3, but also altogether constitute a support member 120 for connecting the conveyor apparatus 3 to the free end 5c of the elastic element 5a (See FIGS. 1 and 3 to 5). Not only is the drive motor 73 housed within the housing 7, but the drive transmission mechanism (shown by 130 in FIG. 5) including the shafts 101 and 109, the pulleys 107 and 111 and the timing belt 113 and others for transmitting the drive force of the drive motor 73 to the conveyor apparatus 3 is also accommodated within the housing 7.

Hereinafter, the operation of the weighing conveyor according to the first aspect will be described.

In the first place, the conveyor apparatus 3 assumes a horizontally straight position with a frame structure having the frames 23, 25, 51 and 51 not being bent about the associated bending fulcrums 52 and 52, and the transport belt 17 is trained under a proper tension between and around the rollers 13 and 15. While in this condition, the rectangular sectioned end 13c of the stud shaft 13b of the drive roller 13 of the conveyor apparatus 3 is inserted into the rectangular shaped hole 109b formed in the extended end 109a of the second transmission shaft 109 that extend inwardly from the downstream V-shaped arm 97a.

Then, the engagement member 41 of the bearing unit 37 supporting the opposite stud shaft 13a of the drive shaft of the conveyor apparatus 3 similarly at the downstream side is engaged in the cutout 95c in the opposite V-shaped arm 95a similarly at the downstream side. Thereafter, by lowering the conveyor apparatus 3, the left and right engagement members 57 and 57 upstream of the conveyor apparatus 3 are engaged in the cutouts 95d and 97c in the similarly upstream V-shaped arms 95b and 97b, respectively. In this way, the conveyor apparatus 3 is now supported by the support member 120, thereby completing the weighing conveyor 2 and, thus, the weight checker 1.

When the drive motor 73 is subsequently powered, the drive force of the drive motor 73 is transmitted to the drive roller 13 through the bevel gears 105 and 103, the first transmission shaft 101, the first transmission pulley 107, the drive transmission timing belt 113, the second transmission pulley 111 and finally through the second transmission shaft 109, wherefore the upper transport surface of the transport belt 17 travels in the transport direction A to successively transport the articles X to be weighed.

On the other hand, the support member 120 including the drive motor 73, the spacer 81, the gear box 83, the cylindrical hollow members 91 and 93, the V-shaped arms 95 and 97, the cover member 99 and others, the drive transmission mechanism 130 including the transmission shaft 101, the pulley 107 and others, and the conveyor apparatus 3 are connected with the free end 5c of the elastic element 5a of the load cell 5 through the fixing member 77 and the bracket 79, so that the total weight of those components are loaded at all times on the load cell 5 as a tare weight. During the successive transport of the articles X to be weighed, the weight of the article X to be weighed add to the total weight and, therefore, the weight of the article X to be weighed can be detected by subtracting the tare weight from the gross weight.

Specifically, in this weighing conveyor 2 according to the first aspect, in the structure including the conveyor apparatus 3 for transporting the articles X to be weighed, the load cell 5 for detecting the weight of each of the articles X to be weighed that are successively transported by the conveyor apparatus 3, and the housing 7 accommodating the load cell 5, as shown in FIG. 4, the fixed end 5b of the load cell 5 is connected with the housing 7 while the free end 5c is connected with the support member 120 for supporting the conveyor apparatus 3, with the support member 120 allowed to protrude outwardly from the bottom surface of the housing 7.

As a result, there is no need to provide the opening on the top and side surface of the housing 7 and the diaphragm.

Also, since it is not the structure wherein the support member is provided on a side of the housing 7 so that the conveyor apparatus 3 can be supported by the housing 7, there is no need to install the support member and other associated members on any surface of the housing 7. Accordingly, the housing 7 can provide a shape comfortable to look with neither projection nor indentation formed on any surface of the housing 7, thereby minimizing the possibility of the dregs of the articles X to be weighed left deposited, stayed still and/or bitten and, also, enhancing cleaning of the housing 7 and, hence, cleaning of the weighing conveyor 2 in its entirety with the cleaning capability consequently increased considerably. Also, since the conveyor 3 can be easily removed, this feature enables the cleaning capability of the housing 7 and, hence, the weighing conveyor 2 to be increased.

In addition, on one hand, since the housing 7 is connected to the fixed end 5b of the elastic element 5a, the weight of the housing 7 is in no way added to the tare weight and, therefore, increase of the tare weight is accordingly suppressed, permitting the weighing accuracy of the weighing conveyor 2 to be increased.

In the weighing conveyor 2 according to this first aspect, after the conveyor apparatus 3 has been mounted immediately above the housing 7 and the support member 120 has subsequently been allowed to protrude outwardly from the bottom surface of the housing 7, it is allowed to extend upwardly of the housing 7 towards the conveyor apparatus 3.

In other words, by allowing the support member 120, once allowed to extend downwardly from the housing 7, to be turned backwards so as to extend upwardly, the conveyor apparatus 3 can be arranged immediately above the housing 7 and, as a result thereof, the space above the conveyor apparatus 3 can be left open wide and, therefore, not only can the articles X to be weighed be successively transported without encountering with any obstruction, but also the inconvenience can be avoided in which the weighed value would be adversely affected as a result of foreign matter falling from the housing 7 onto the conveyor apparatus 3.

Also, in the weighing conveyor 2 according to the first aspect, a surface of the housing 7 confronting the conveyor apparatus 3 is defined by an inclined surface continuing downwardly. In other words, particularly as shown in FIGS. 1 and 5, the covering member 72 forming the upper half of the housing 7 is so shaped as to represent a gentle hill.

Accordingly, even though dregs or the like of the articles X to be weighed that are successively transported by the conveyor apparatus 3 fall and/or are scattered to deposit on the surface of the housing 7, they can slip downwardly from the housing 7 and will not remain deposited or staying on the surface of the housing 7. Therefore, inconveniences such as degradation of the sanitary condition and/or proliferation of unwanted bacteria can advantageously be avoided.

Also, in the weighing conveyor 2 according to the first aspect, the drive motor 73 for driving the conveyor apparatus 3 is as well accommodated within the housing 7. Accordingly, there is no need to use a second separate housing for accommodating the drive motor 73, making it possible to simplify the entire structure of the weighing conveyor 2 and, therefore, the problem associated with deposition of the dregs or the like can be alleviated to increase the cleaning capability.

At the same time, since, for example, electric lines extending from and to the drive motor 73 can be disposed only within the housing 7 without being exposed to the outside, this feature enables the surface shape of the housing 7 to be neat and the problem associated with deposition of the dregs can be alleviated to thereby increase the cleaning capability. In addition, the electric lines and others need not be passed inwardly and outwardly of the housing 7 through the diaphragm 85 and, therefore, the problem associated with reduction in water and dust proof properties of the housing 7 can be avoided, too.

Yet, in the weighing conveyor 2 according to the first aspect, the drive transmission mechanism 130 for transmitting the drive force of the drive motor 73 to the conveyor apparatus 3 is accommodated within the support member 120. Accordingly, since the drive transmission mechanism 130 including the drive transmission belt 113, the pulleys 107 and 111 and others are accommodated by the utilization of the support member 120, any possible deposition of the dregs of the articles X on the drive transmission mechanism 130 itself can be avoided. Also, there is no need to use any separate housing for accommodating solely the drive transmission mechanism 130, allowing the weighing conveyor 2 as a whole to be simplified in structure and, accordingly, not only the problem associated with a propensity of the dregs of the articles X being deposited, but also the problem associated with the cleaning capability for removing the deposited dregs can be alleviated.

In the next place, the weighing conveyor 2 equipped with the conveyor apparatus according to a second aspect will be described. While the basic structure of the weighing conveyor 2 is identical with that according to the first aspect, the following is featured.

In other words, in the weighing conveyor equipped with the conveyor apparatus according to the second aspect, the frames 23 and 25 that form the roofing members of the previously described conveyor apparatus 3 and the frame 51 that forms the bracket used in the previously described conveyor apparatus 3 are so bendable that when those frames are bent, the endless transport belt 17 can be removed from at least the pair of the rollers 13 and 15 supported by those frames, and the bending fulcrums 52 about which the frames 23, 25, 51 and 51 can be bent are arranged offset on one side of the line of extension L, connecting respective axes of rotation of the rollers 13 and 15 when the frames are not bent, adjacent the belt travel surface while a stop member (the roofing members 23 and 25) is employed for inhibiting the frames 23, 25, 51 and 51 from being bent towards the opposite side of the belt travel surface.

Also, in the weighing conveyor equipped with the conveyor apparatus according to a third aspect, in the structure including the drive motor 73 which is the drive source for driving one of the rollers 13 and 15, the pulley 107 coupled with the drive shaft 73a of the drive motor 73, the pulley 111 provided coaxial on one of the rollers 13 and 15, and the endless drive transmission timing belt 113 trained between and around the pulleys 107 and 111, the bending fulcrums 52 of the frames 23, 25, 51 and 51 are arranged offset on one side of the line of extension L1 of the shaft 109, which is a rotary shaft for the pulley 111 when the frames are not bent, adjacent the belt travel surface while a stop member (the roofing members 23 and 25) is employed for inhibiting the frames 23, 25, 51 and 51 from being bent towards the opposite side of the belt travel surface.

More specifically, in the conveyor apparatus according to the second aspect, as shown in FIGS. 3 and 4, the bending fulcrums 52 and 52 of the frames 23, 25, 51 and 51 do not lie on the line of extension L connecting between the stud shaft 13a (13b) serving as the axis of rotation of the drive roller 13 and the stud shaft 15a serving as the axis of rotation of the driven roller 15, but are positioned offset downwardly therefrom. Also, in the conveyor apparatus according to the third aspect, the bending fulcrum 52 is positioned offset downwardly from the line of extension of the shaft 109 which is a rotary shaft for the pulley 111 for rotating the drive roller 13. The bending fulcrum 52 referred to above is the fulcrum about which the frames 23 and 25 for rotatably supporting the drive roller 13 and the frames 51 and 51 for rotatably supporting the driven roller 15 bend.

Accordingly, as shown in FIGS. 3 and 4, when the frames 23, 25, 51 and 51 extend straight without being bent, the distance between the rollers 13 and 15 is so long enough to allow the transport belt 17, trained between and around the rollers 13 and 15, to be held under proper tension. Accordingly, the articles X to be weighed can be properly transported by the transport belt 17 successively.

On the other hand, by the action of a resilient restoring force of the transport belt 17 then held under tension, the frames 23, 25, 51 and 51 tend to bend about the bending fulcrums 52 and 52. In such case, since the bending fulcrums 52 and 52 are offset downwardly from the center line L connecting between the rollers 13 and 15, the frames 23, 25, 51 and 51 are likely to bend towards the upper transport surface as shown by the arrows B and B in FIGS. 3 and 4.

At this time, as shown in FIGS. 2, 3 and 6, respective upper surfaces of the roofing members 23 and 25, which are the frames, respectively, extend upstream towards above the brackets 51 and 51 which are similarly the frames. Consequently, respective upper edges of ones 51 and 51 of the frames (brackets) are brought into contact with the others 23 and 25 of the frames (left and right outer roofing members, that is, stop members), wherefore the frames 23, 25, 51 and 51 are inhibited from being bent further towards the upper transport surface as shown by the arrows B and B.

Hereinafter, the operation of the weighing conveyor 2 equipped with the conveyor apparatus according to any one of the second and third aspects will be described with particular reference to FIGS. 9 to 11.

Figure 9:
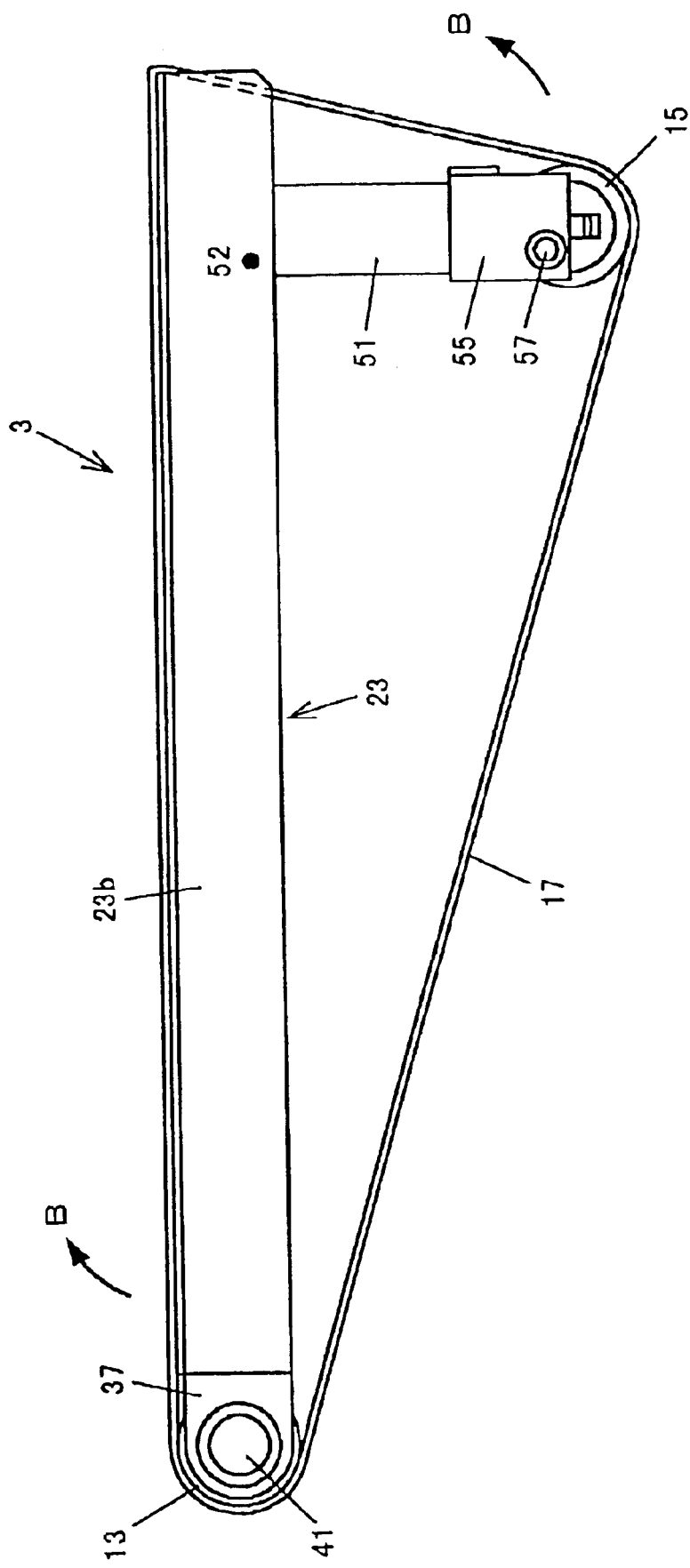
FIG. 9 is an explanatory diagram showing how the conveyor apparatus is assembled.

When the conveyor apparatus 3 is desired to be set in position ready for use with the transport belt 17 mounted thereon, the frames 23, 25, 51 and 51 have to be bent about the bending fulcrums 52 and 52 in a direction towards a lower run of the transport belt 17 opposite to the transport surface thereof as shown in FIG. 9 and, while in this condition, the transport belt 17 is trained between and around the rollers 13 and 15. Since at this time the distance between the rollers 13 and 15 is shortened, the transport belt 17 can be mounted easily in a loosened state.

Figure 10:
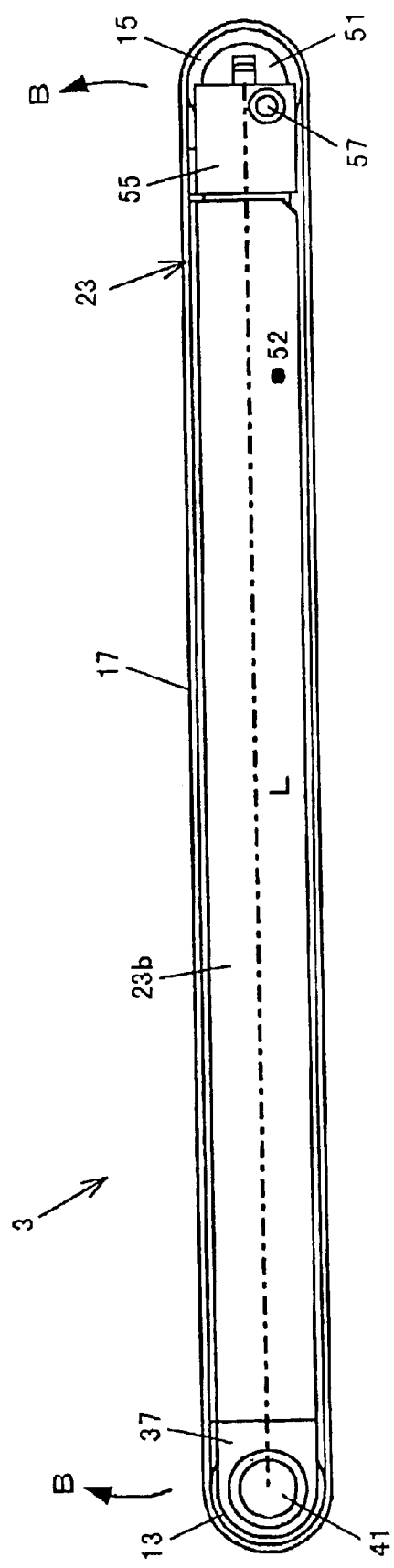
FIG. 10 is an explanatory diagram used to explain the operation of the conveyor apparatus.

Thereafter, the frames 23, 25, 51 and 51 are pivoted in respective directions shown by the arrows B and B about the bending fulcrums 52 until they assume a straight position as shown in FIG. 10. When the frames 23, 25, 51 and 51 assume the straight position extending horizontally without bending at the bending fulcrums 52 and 52, the distance between the rollers 13 and 15 is lengthened and, accordingly, the transport belt 17 is held under a proper tension having been stably trained between and around the rollers 13 and 15.

On the other hand, as a reactive force resulting from the tension of the transport belt 17, an elastic restoring force of the transport belt 17 acts on the frames 23, 25, 51 and 51. An external stress thereof urges the frames 23, 25, 51 and 51 to rock about the bending fulcrums 52 and 52 in the directions B and B or the direction counter to the transport surface of the belt 17. However, since as hereinabove discussed, the bending fulcrums 52 and 52 do not lie on the center line L connecting between the rollers 13 and 15 and are particularly positioned as offset towards the direction counter to the transport surface, the frames 23, 25, 51 and 51 do, when assuming the straight position as shown in, for example, FIG. 10, tend to bend in the directions B and B towards the transport surface.

Then, at this time, as hereinabove described, the upper edges of the brackets 51 and 51, which are ones of the frames, are brought in contact with the upper surfaces of the outer left and right roofing plates 23 and 25, which are the others of the frames, to thereby inhibit the frames from being further bent in the directions B and B beyond the straight position and, therefore, the frames 23, 25, 51 and 51 of the conveyor apparatus 3 are after all held in and locked at the straight position.

In particular, with the conveyor apparatus according to the third aspect, the frames 23, 25, 51 and 51 are affected by not only the resilient restoring force of the transport belt 17 trained between and around the rollers 13 and 15, but also a resilient restoring force of the timing belt 113 and do therefore tend to bend strongly in the direction close towards the other belt run surface. Accordingly, the frames 23, 25, 51 and 51, when being not bent, are firmly maintained and locked in a non-bending condition by the roofing members 23 and 25.

Therefore, in the conveyor apparatus according to any one of the second and third aspects, no separate dedicated lock pin or the like need be employed to inhibit bending of the frames 23, 25, 51 and 51, allowing the conveyor apparatus 3 to be simplified in structure. Consequently, the number of component parts of the conveyor apparatus 3 is reduced and the tare weight can also be reduced to thereby increase the weighing accuracy. Also, the conveyor apparatus 3 can easily be cleaned, resulting in increase of the cleaning capability. In addition, when the transport belt 17 is to be removed, no lock pin or the like need be manipulated and simply bending or straightening of the frames 23, 25, 51 and 51 is sufficient, thereby simplifying the removal or mounting of the transport belt 17.

Also, when and after the conveyor apparatus 3 has been assembled in a condition ready for use, as is the case with the weighing conveyor according to the previously described first aspect, the rectangular sectioned end 13c of the drive roller shaft 13b has to be inserted into the correspondingly rectangular hole 109b defined in the extended end 109a of the second transmission shaft 109 that protrudes inwardly from the downstream V-shaped arm 97a.

Then, the engagement member 41 of the bearing unit 37 then supporting the drive shaft 13a opposite to the conveyor apparatus 3 similarly on the downstream side is engaged in the cutout 95c defined in the opposite V-shaped arm 95a similarly on the downstream side. Then, as shown by C in FIG. 11, the conveyor apparatus 3 is lowered onto the support member 120 with the point of engagement of them used as a fulcrum, until the upstream left and right engagement members 57 and 57 of the conveyor apparatus 3 are engaged in the respective cutouts 95d and 97c in the similarly upstream V-shaped arms 95b and 97b. In this way, the conveyor apparatus 3 is supported by the support member 120 to thereby complete the weight checker 1 as a whole.

Thereafter, as is the case with the weighing conveyor according to the previously described first aspect, when the drive motor 73 is electrically powered on, the transport belt 17 is driven with the upper transport surface traveling in the direction shown by the arrow A to successively transport the articles X to be weighed so that the articles X can be weighed one at a time during the transport thereof.

Figure 11:
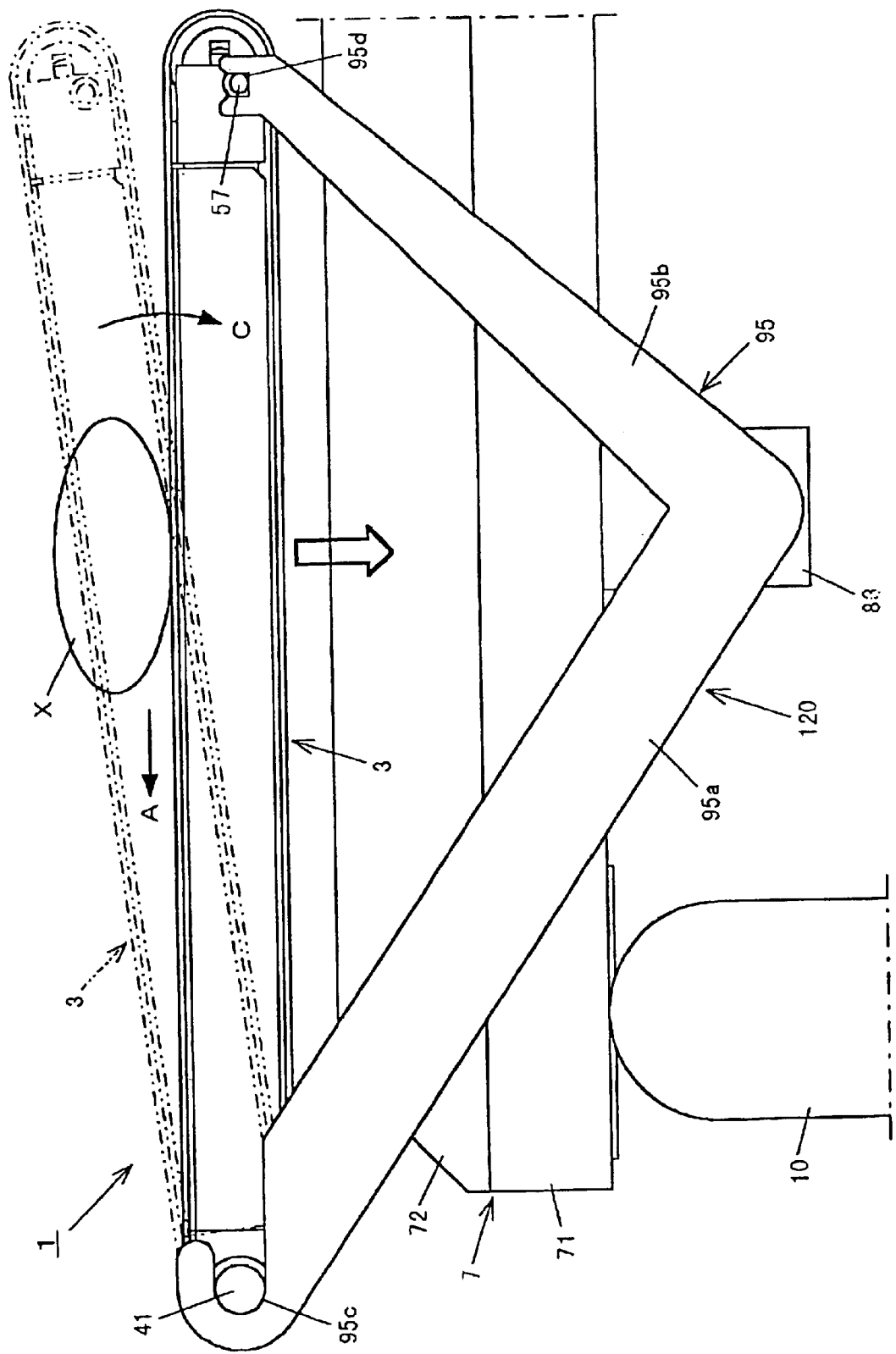
FIG. 11 is an explanatory diagram showing how the weighing conveyor is assembled.

In particular, in the conveyor apparatus according to any one of the second and third aspects, since the frames 23, 25, 51 and 51 are so designed and so configured that they cannot bend towards the side B and B of the transport surface of the transport belt 17, even though as shown by the arrow in FIG. 11, the weight of the article X to be weighed then being transported imposes a stress on the frames 23, 25, 51 and 51 to urge the latter to bend, the conveyor apparatus 3 will not bend and is rather prevented from being bend towards the opposite transport surface (in a direction counter to the direction B) and, accordingly the possibility of unlocking of the frames 23, 25, 51 and 51 then in the straight position during the transport of the articles can be avoided stably.

Also, as the drive roller 13 on the downstream side rotates, the upper belt run of the transport belt 17, which defines the transport surface for the support of the articles, is tensioned and, accordingly, by the action of the tension, the frames 23, 25, 51 and 51 are strongly urged to bend in the direction B and B towards the transport surface. Because of this, the conveyor apparatus 3 when held in a non-bending state during the use thereof, can be firmly locked at such non-bending position.

Also, as described in connection with the weighing conveyor according to the previously described first aspect, by causing the springs 59 and 59, which are employed as the biasing members and provided on the brackets 51 and 51, to urge the upstream driven roller 15 further in the upstream direction and also by adjusting the biasing forces through a rotating manipulation of the screw rods 63 and 63, the transport belt 17 can be assuredly held under taut at all times even though, for example, the material, length, resiliency and others of the transport belt 17 varies. As a result, the resilient restoring force of the belt 17 can be secured and it is therefore warranted that the frames 23, 25, 51 and 51 can be locked in the straight position without being bent. Also, the tension of the belt 17 and, hence, the resilient restoring force of the belt 17 can be adjusted and, therefore, the force of the frames 23, 25, 51 and 51 tending the latter to bend can be adjusted variably.

Also, as described in connection with the weighing conveyor according to the previously first aspect, by providing on the transport belt 17 the protruding edge portions 17a and 17a, which are indentations for regulating any possible displacement in position in the widthwise direction by means of engagement with the rollers 13 and 15, any possible tortuous motion during the run of the transport belt 17 can be suppressed, allowing the belt 17 to be stably held under taut at all times. As a result, the resilient restoring force of the transport belt 17 can be stably secured at all times and, therefore, it is warranted that the frames 23, 25, 51 and 51 are locked in the straight position without being bent.

Also, in the conveyor apparatus according to any one of the first and second aspects, where the roofing members 21 . . . 21, 23 and 25 are employed for supporting the transport surface of the transport belt 17 from rear side to thereby prevent it from being slackened so that the articles X to be weighed can be smoothly and stably transported, those roofing members and, more specifically, the left and right outer roofing members 23 and 25 are utilized to serve as stop members for avoiding bending of the frames 23, 25, 51 and 51 and, accordingly, the structure of the conveyor apparatus 3 can be simplified along with reduction of the number of the component parts used.

Another embodiment of the conveyor apparatus according to the second aspect will now be described with reference to FIGS. 12 and 13. It is to be noted that component parts identical with or similar to those of the conveyor apparatus according to the above described second aspect are shown by like reference numerals.

Figure 12:
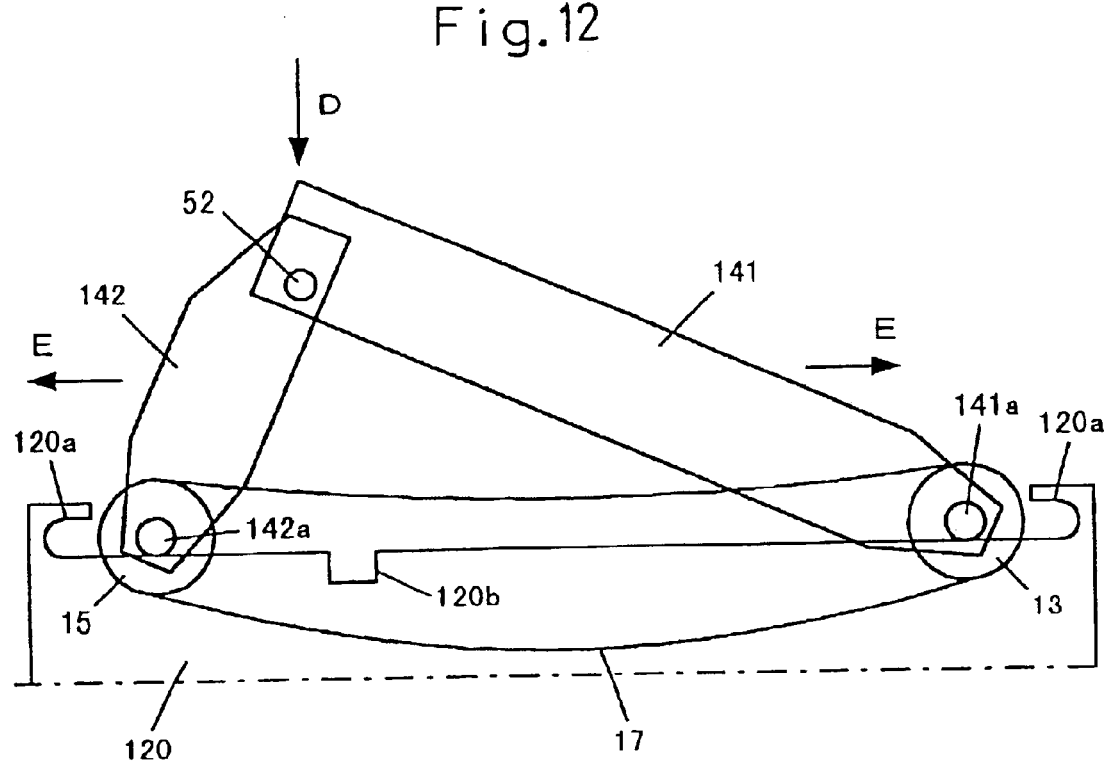
FIG. 12 is a schematic side view of the conveyor apparatus according to another preferred embodiment of the present invention, showing the conveyor apparatus before being assembled.

In this embodiment, as shown in FIG. 12, the support member 120 is formed with hook-shaped engagement portions 120a and 120a. On the other hand, conveyor frames 141 and 142 of the conveyor apparatus 3 are provided with respective pin members 141a and 142a.

By bending the conveyor frames 141 and 142 about the fulcrum 52, the transport belt 17 is trained between and around the rollers 13 and 15. In this position, the pin members 141a and 142a are positioned on an upper edge portion of the support member 120 and when it is urged downwardly as shown by the arrow D, the pin members 141a and 142a slide towards a direction shown by E along the upper edge portion of the support member 120 and are finally received and engaged into the engagement portions 120a and 120a as shown in FIG. 13. In this way, the conveyor apparatus 3 is supported by the support member 120.

At this time, the conveyor frames 141 and 142 extend straight and are held in a position ready for use. The support member 120 is formed with a cutout 120b into which a support shaft 52 defining the bending fulcrum is engaged and, by allowing the support shaft 52 to be brought into engagement with the cutout 120b, any possible bending of the conveyor frames 141 and 142 in a reverse direction beyond the straight position can be prevented.

Figure 13:
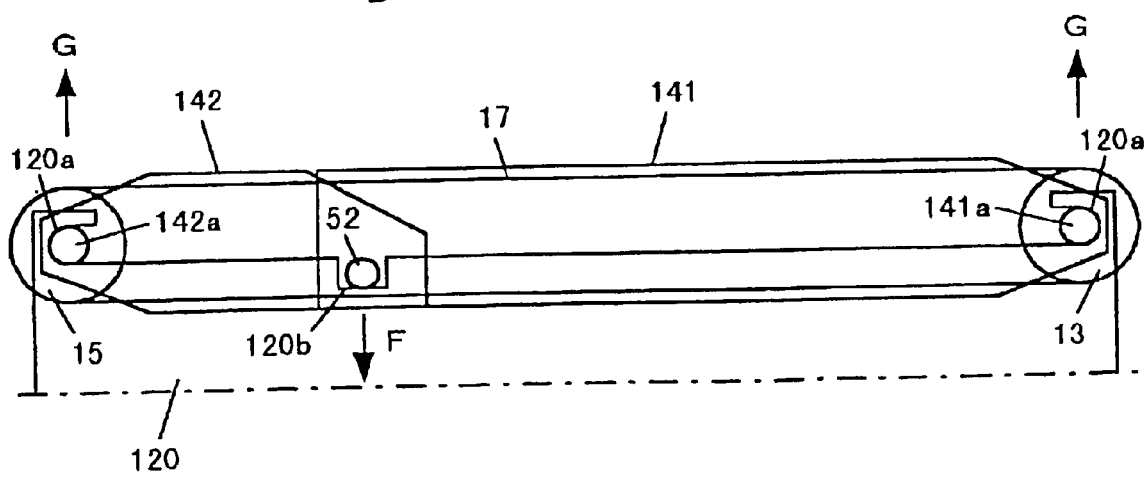
FIG. 13 is a diagram showing how the conveyor apparatus is assembled.

Even in this embodiment, since the bending fulcrum 52 is offset from the center line connecting between the rollers 13 and 15, when in the straight position as shown in FIG. 13, forces acting in upward directions G and G are induced by the tension of the transport belt 17 so as to act in the engagement portions 120a and 120a while a force acting in a downward direction F acts on the cutout 120b. And, in this condition, the conveyor apparatus 3 while being supported by the support member 120 is locked in the straight position.

In this way, when as shown in FIG. 13, the frames 141 and 142 of the conveyor apparatus 3 are not bent, the pin members 141a and 142a of the conveyor apparatus 3 are engaged in the engagement portions 120a and 120a of the support member 120, respectively whereas when as shown in FIG. 12, the frames 141 and 142 of the conveyor apparatus 3 are bent, the pin members 141a and 142a of the conveyor apparatus are disengaged from the engagement portions 120a and 120a of the support member 120, respectively.

Accordingly, by causing the conveyor frames 141 and 142 to extend straight, mounting of the transport belt 17 onto the conveyor apparatus 3 and mounting of the conveyor apparatus 3 onto the support member 120 or the inspecting machine can be performed simultaneously. Also, by bending the conveyor frames 141 and 142, removal of the transport belt 17 from the conveyor apparatus 3 and removal of the conveyor apparatus 3 from the support member 120 or the inspecting machine can be performed simultaneously.

As a result, no extra fixture or the like dedicated to allow the conveyor apparatus 3 to be assembled together with the support member 120 is needed, thereby simplifying the structure of the weighing conveyor 2. Consequently, the number of the component parts of the weighing conveyor 2 is reduced and reduction of the tare weight and, hence, increase of the weighing accuracy can be attained. Also, it becomes easy to cleanse the weighing conveyor 2, thereby increasing the cleaning capability. In addition, when the conveyor apparatus 3 is desired to be mounted or removed, there is no need to manipulate the fixture or the like and mere bending and straightening of the conveyor frames 141 and 142 are sufficient, allowing the selective mounting and removal of the conveyor apparatus 3 to be simplified.

Figure 14:
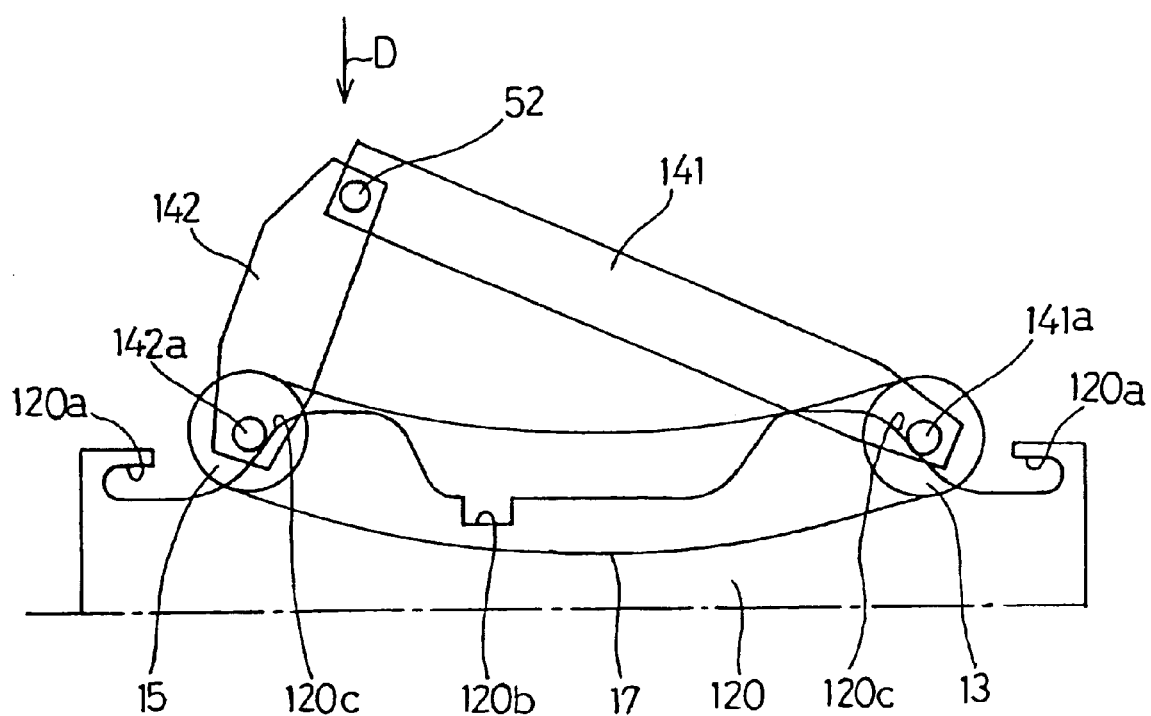
FIG. 14 is a schematic side view showing a modification of the conveyor apparatus shown in FIG. 12.

A modified form of the embodiment shown in FIGS. 12 and 13 is shown in FIG. 14. In this modified form, the upper edge portion of the support member 120 is formed with guide portions 120c and 120c defined by inclined faces that are inclined downwardly towards the engagement portions 120a and 120a at the opposite ends inwardly of the engagement portions 120a and 120a, respectively.

In this example, when the conveyor frames 141 and 142 bent about the fulcrum 52 are urged towards the direction D, the pin members 141a and 142a are slidingly guided along the inclined faces of the guide portions 120c and 120c towards the engagement portions 120a and 120a and, therefore, the force necessary to urge towards the direction D may be smaller than that required in the example shown in FIGS. 12 and 13.

Although in FIG. 14 reference has been made to the use of the two guide portions 120c and 120c, only one of them may be sufficient.

Figure 15:
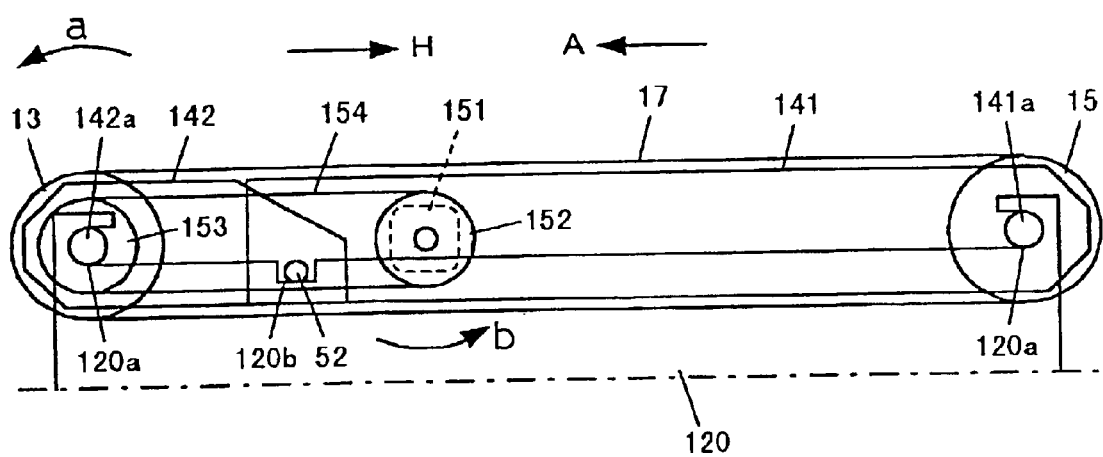
FIG. 15 is a schematic side view of the conveyor apparatus according to a further preferred embodiment of the present invention.

In the next place, a further embodiment of the conveyor apparatus according to the third aspect will be described with reference to FIG. 15. It is, however, to be noted that component parts identical with or similar to those in the previously described embodiment are shown by like reference numerals.

In this embodiment, the drive motor 151 for driving the drive roller 13 is disposed between upper and lower runs of the transport belt 17. An endless drive transmission belt 154 is trained between and around a pulley 152, fixedly mounted on the drive shaft of the drive motor 151, and a pulley 153 fixedly and coaxially mounted on the drive roller 13.

At this time, the bending fulcrum 52 of the conveyor frames 141 and 142 does not lie on a line of extension connecting between the respective longitudinal axes of the pulleys 152 and 153 when the frames 141 and 142 are not bent, but is positioned offset downwardly therefrom. Also, the drive motor 151 is positioned on one side of the bending fulcrum 52 adjacent the driven roller 15.

According to this design, in place of or in combination with the resilient restoring force of the transport belt 17 trained between and around the rollers 13 and 15, and under the influence of the resilient restoring force of the drive transmission belt 154 for transmitting the drive of the drive motor 151 to the drive roller 13, the conveyor frames 141 and 142 tend to bend towards the upper transport surface. Accordingly, so long as the conveyor frame 141 and 142 are not bent, the condition in which they do not bend is firmly maintained and is thus locked.

Also, when the conveyor frames 141 and 142 are bent, mounting and removal of the transport belt 17 results in concurrent mounting and removal of the drive transmission belt 154.

It is to be noted if in such case the transport direction is that shown by the arrow A, as hereinbefore described the upper transport surface of the transport belt 17 is desirably held under taut. For this purpose, the drive motor 151 is driven in the direction b so that the drive roller 13 can be driven in a direction shown by the arrow a. Conversely, in order for the upper run of the drive transmission belt 154 to be held under taut, the drive motor 152 is driven in a direction counter to the direction shown by the arrow b. At this time, the drive roller 13 is driven in a direction counter to the direction shown by the arrow a and the transport belt 17 runs in a direction shown by the arrow H that is counter to the direction A. In the present invention, depending on the situation, any of those directions can be suitably selected.

In the next place, the weighing conveyor 2 according to a fifth aspect of the present invention will be described. This weighing conveyor 2 has a basic structure similar to that according to the above described first aspect and is featured in the following. Specifically, a load detector 5 for detecting the weight of the article X to be weighed that is transported by the conveyor apparatus 3, in terms of up and down displacement thereof is employed, and the axis of rotation of the motor 73 that is the drive source is disposed parallel to the direction of displacement brought about by the article X to be weighed.

Figure 16:
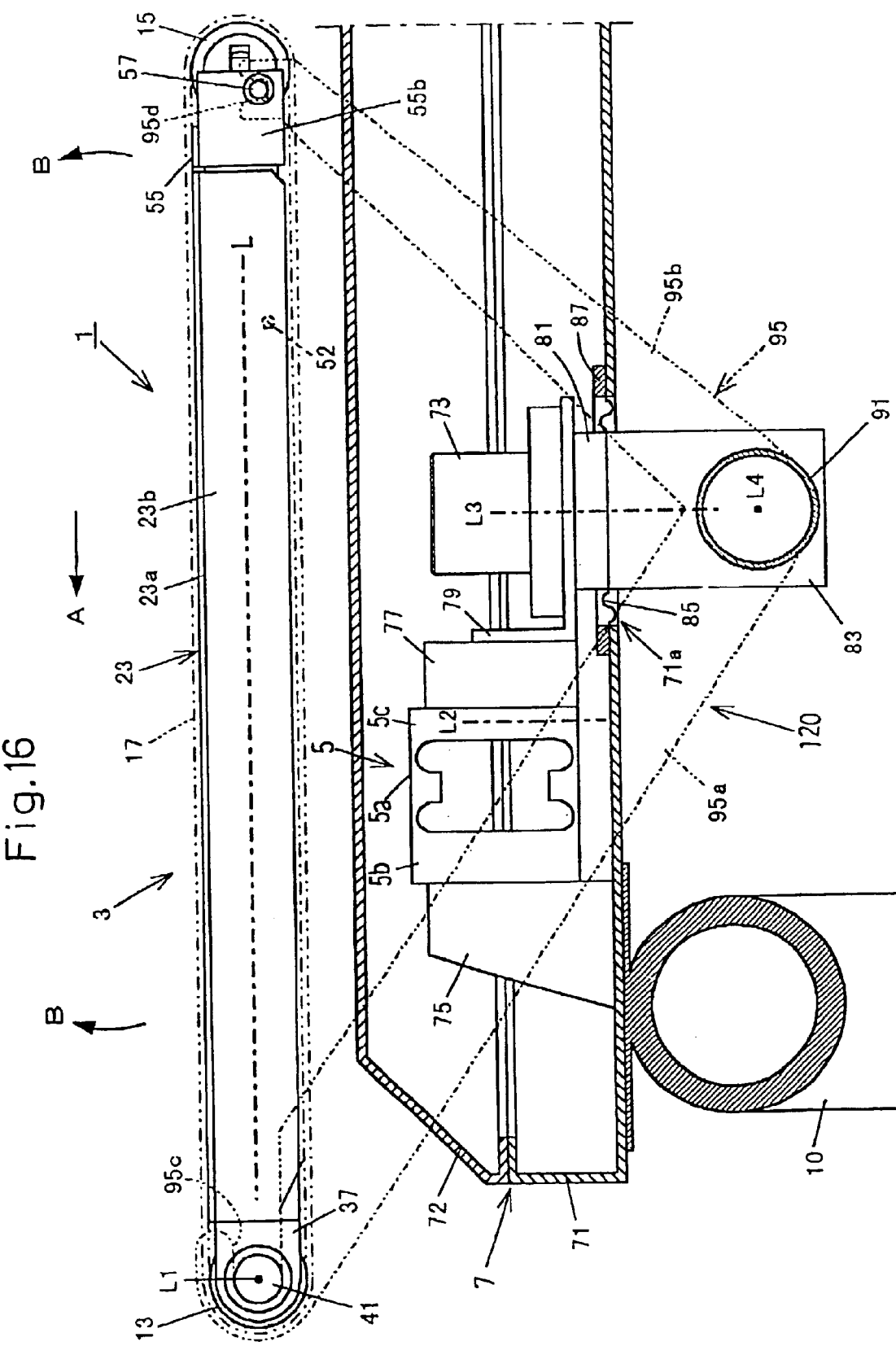
FIG. 16 is a right side view of the weighing conveyor showing another aspect of the present invention, showing the structure inside the housing in a partially cut-out sectional representation.
Figure 17:
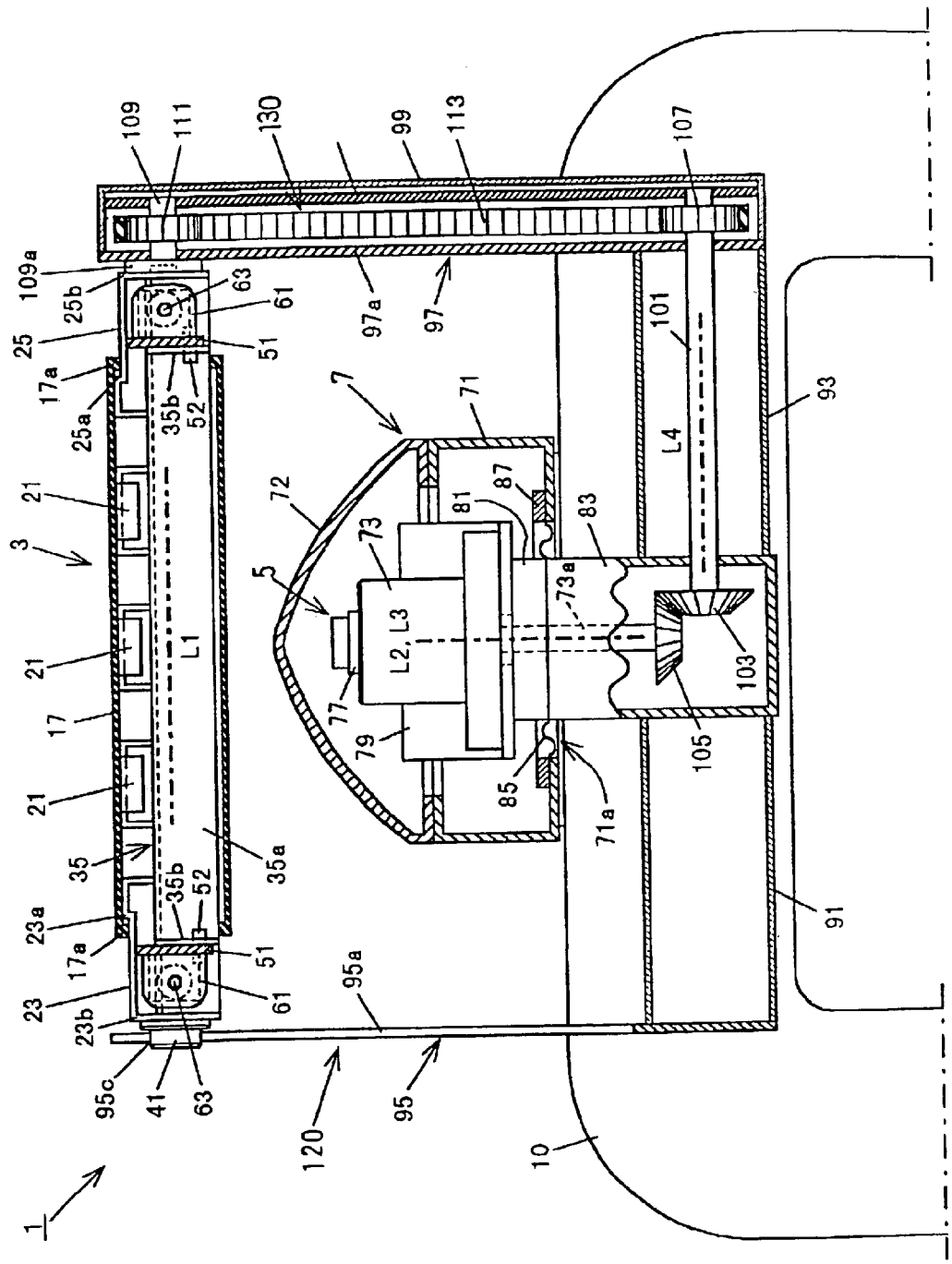
FIG. 17 is a longitudinal sectional view of the weighing conveyor, as viewed from an upstream side towards a downstream side.

In particular, the weighing conveyor 2 according to this aspect is of a type wherein the articles X to be weighed that are placed on the transport belt 17 are successively transported in the horizontal direction. Accordingly, as shown in FIGS. 16 and 17, the transport surface of the conveyor apparatus 3, that is, the upper run of the transport belt 17 extends in the horizontal direction. Also, the rollers 13 and 15 around which the transport belt 17 is trained are similarly extend in the horizontal direction. The direction in which the transport surface of the conveyor apparatus 3 extends is referred to as a first direction and is indicated by L1 shown as extending in the direction in which the drive roller 13 extends.

On the other hand, the load brought about by the conveyor apparatus 3 and/or the articles X to be weighed is loaded downwards on the load cell 5 under the influence of a gravitational force. Accordingly, the elastic element 5a of the load cell 5 displaces up and down during detection of the load. The direction in which the elastic element 5a of the load cell 5 displaces during detection of the load is referred to as a second direction and is indicated by L2 shown as extending in a direction in which the free end portion 5c extends.

In other words, in this weighing conveyor 2, the direction L1 in which, the transport surface of the conveyor apparatus 3 extends and the direction L2 in which the elastic element 5a of the load cell 5 displaces lie perpendicular to each other. While in such design, the drive shaft 73a of the drive motor 73 for driving the conveyor apparatus 3 is rendered to extend in the same up and down direction as the direction L2 in which the elastic element 5a of the load cell 5 displaces, not in the same horizontal direction as the direction L1 in which the transport surface of the conveyor apparatus 3 extends. The direction in which the drive shaft 73a of the drive motor extends is referred to as a third direction and is indicated by L3 shown as extending in a direction in which the drive shaft 73a extends.

Thus, a rotational vibration of the drive shaft 73a of the drive motor 73 occurs only in the horizontal direction and the direction thereof lies perpendicular to the up and down direction in which the elastic element 5a displaces. Accordingly, the direction (horizontal direction) in which the rotational vibration of the drive shaft 73a of the drive motor 73 acts and the direction (up and down direction) in which the elastic element 5a displaces during detection of the load does not coincide with each other. As a result, the possibility can be avoided in which the load cell 5 picks up and detects a change in load brought about by the rotational vibration referred to above and, hence, the possibility of excessive external noises appearing in the weight signal of the load cell 5 can be avoided. Therefore, reduction in weighing accuracy can be effectively avoided, resulting in increase of the weighing accuracy.

Moreover, since a simple design is employed in which the drive shaft 73a of the drive motor 73 is so arranged vertically as to extend parallel to the direction in which the elastic element 5a of the load cell 5 displaces, the weighing conveyor 2 has a hardware structure that does not become complicated. Also, since no noises is contained in the weight signal of the load cell 5, the weight signal can be used by itself and, therefore, no software structure of a signal processing is not complicated as well.

In addition, when the drive motor 73, which is a major source of generation of drive noises and is also a heavy item, is disposed adjacent the free end portion 5c of the elastic element 5a of the load cell 5, the center of gravity of the drive motor 73 can be brought to a position adjacent the center of moment of the load cell 5 and, accordingly, any influence which will be brought about by the external noises on the load cell 5 can be reduced. Yet, even though the drive motor 73, which is the source of the drive noises, is positioned adjacent the free end portion 5c, the load cell 5 will not be affected by the influence brought about by the drive noises since the direction in which the vibration acts is different from the direction of detection of the load cell 5.

In the meantime, since the drive shaft 73a of the drive motor 73 is so arranged as to extend in the up and down direction, the axis of a rotational drive force initially generated by the drive motor 73 does also extend in the up and down direction. This direction does not coincide with the horizontal direction in which the transport surface of the conveyor apparatus 3 extends. Yet, it does not coincide with a leftward and rightward direction in which the axis of the drive roller 13, that should initially transmit the drive force, extends.

In view of the foregoing, during transmission of the power by means of the drive transmission mechanism 130 disposed between the drive motor 73 and the drive roller 13, the direction in which the axis of the rotational drive force generated by the drive motor 73 is so arranged as to be converted into the horizontal direction in which the transport surface of the conveyor apparatus 3 extends and, at the same time, in the leftward and rightward direction in which the axis of the drive roller 13 extends.

More specifically, using the pair of the bevel gears 105 and 103, a drive transmission path is bent from the direction L3, in which the drive shaft 73a extends, to the direction L4 in which the transmission shaft 101 extends. In this way, the drive force of the drive motor 73 can be properly and smoothly inputted to the drive roller 13 and is hence transmitted to the conveyor apparatus 3.

Hereinafter, the weighing conveyor 2 according to sixth to ninth aspects of the present invention will be described. This weighing conveyor 2 has a basic structure similar to that according to the previously described first aspect and is featured in the following. In other words, respective positions of the conveyor apparatus 3 and the drive transmission mechanism 130 relative to the load cell 5 are so chosen as to render the center of gravity R of the weighing conveyors 2, comprised of them, to approach to the center of moment S of the load cell 5 to thereby increase the weighing accuracy.

In the weighing conveyor 2 according to the sixth aspect, the conveyor apparatus 3 is disposed above the load cell 5 which is the load detector and the drive motor 73, which is the drive source, is disposed at the substantially same position as the load cell 5 with respect to the up and down direction or below the load cell 5, and the drive transmission mechanism 130 is so disposed as to extend between respective positions below and above the load cell 5. Accordingly, a composite center of gravity R of the conveyor apparatus 3, the motor 73 and the drive transmission mechanism 130 is positioned in the vicinity of the center of moment S of the load cell 5 with respect to the up and down direction.

In the weighing conveyor according to the seventh aspect, the conveyor apparatus 3 is disposed below the load cell 5, the motor 73 is disposed at the substantially same position as the load cell 5 with respect to the up and down direction, and the drive transmission mechanism 130 is so disposed as to extend between respective positions above and below the load cell 5, so that the composite center of gravity R of the conveyor apparatus 3, the motor 73 and the drive transmission mechanism 130 is positioned in the vicinity of the center of moment S of the load cell 5 with respect to the up and down direction.

In the weighing apparatus according to the eighth aspect, the conveyor apparatus 3 is disposed at a position substantially intermediate of the conveyor apparatus 3 with respect to the direction of transport of the articles to be weighed, the motor 73 is disposed in the vicinity of the load cell 5 and the drive transmission mechanism 130 is so disposed as to extend between respective positions downstream and upstream of the load cell 5 with respect to the direction of transport, so that the composite center of gravity R of the conveyor apparatus 3, the motor 73 and the drive transmission mechanism 130 is positioned in the vicinity of the center of moment S of the load cell 5 with respect to the up and down direction.

In the weighing conveyor according to the ninth aspect, the conveyor apparatus 3 is disposed at a position substantially intermediate of the conveyor apparatus 3 with respect to the direction of transport of the articles to be weighed, the motor 73 is disposed at the substantially same position as the load cell 5 with respect to the transport widthwise direction and the drive transmission mechanism 130 is so disposed as to extend between the same position as the load cell 5 with respect to the transport widthwise direction and right or left position with respect to the transport widthwise direction and also as to extend between respective positions leftwards and rightwards of the load cell 5 with respect to the transport widthwise direction, so that the composite center of gravity R of the conveyor apparatus 3, the motor 73 and the drive transmission mechanism 130 is positioned in the vicinity of the center of moment S of the load cell 5 with respect to the up and down direction.

Figure 18:
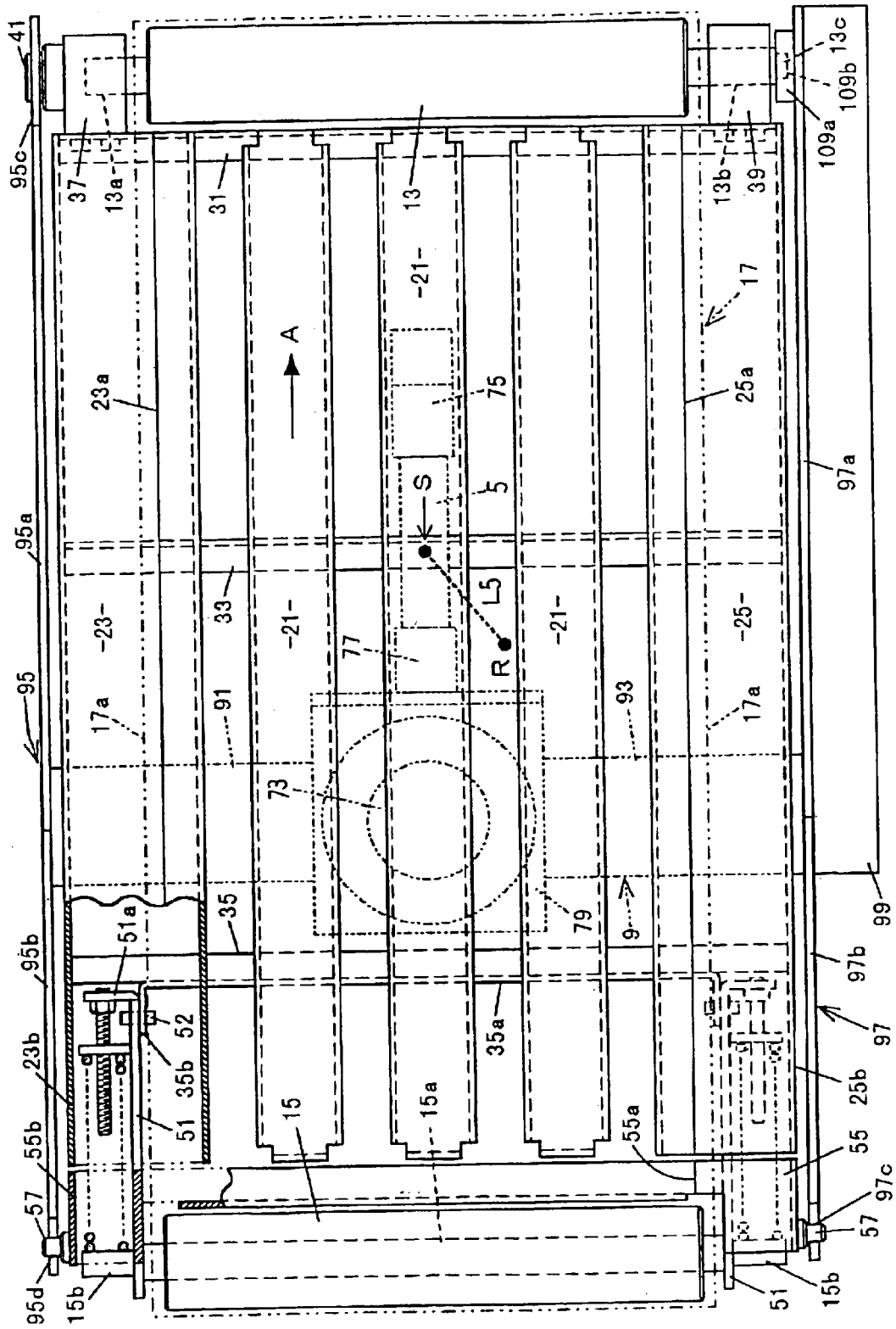
FIG. 18 is a plan view of the conveyor apparatus of the weighing conveyor, showing a further aspect of the present invention with a portion cut out.
Figure 19:
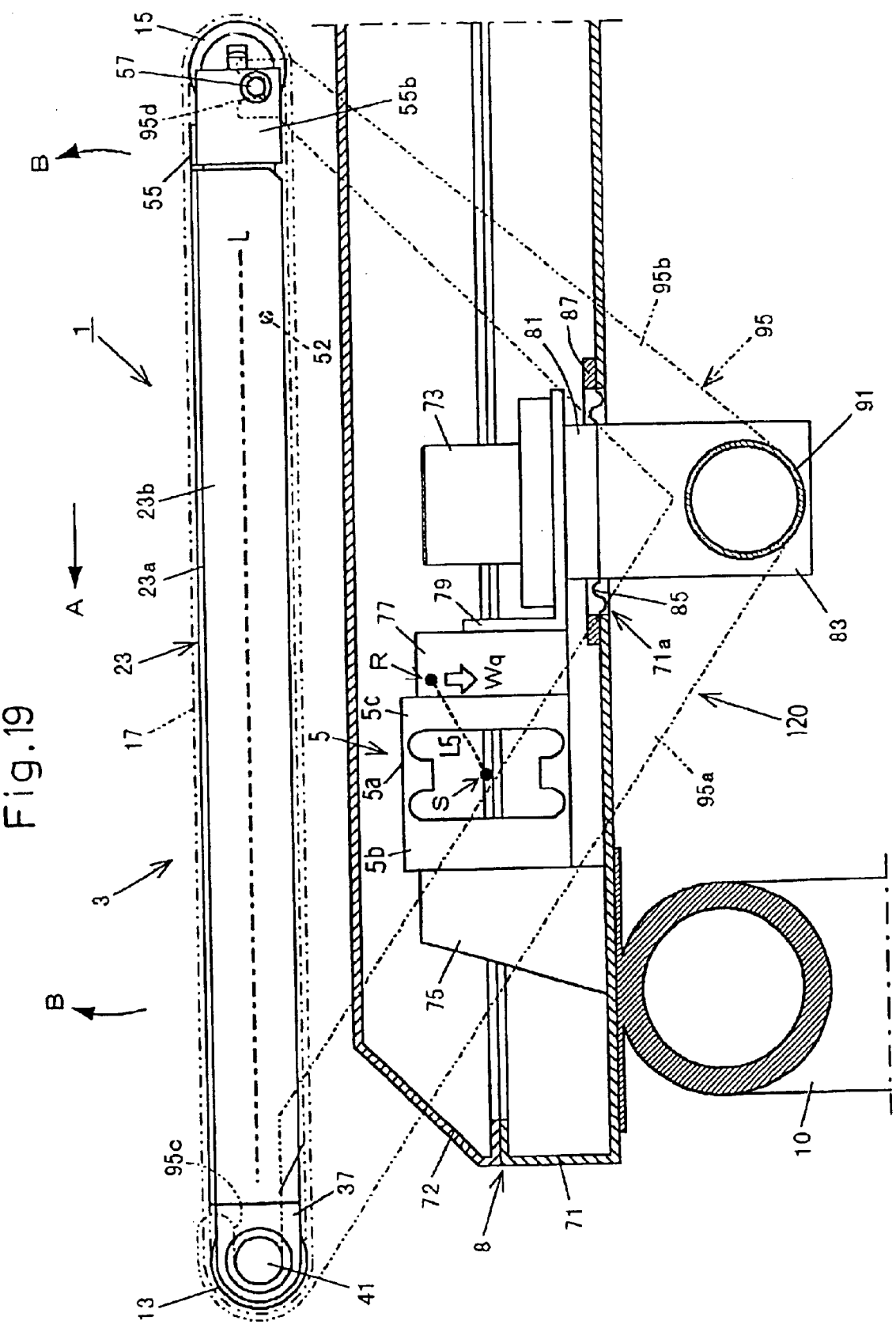
FIG. 19 is a right side view of the weighing conveyor, showing the structure inside the housing in a partially cut-out sectional representation.
Figure 20:
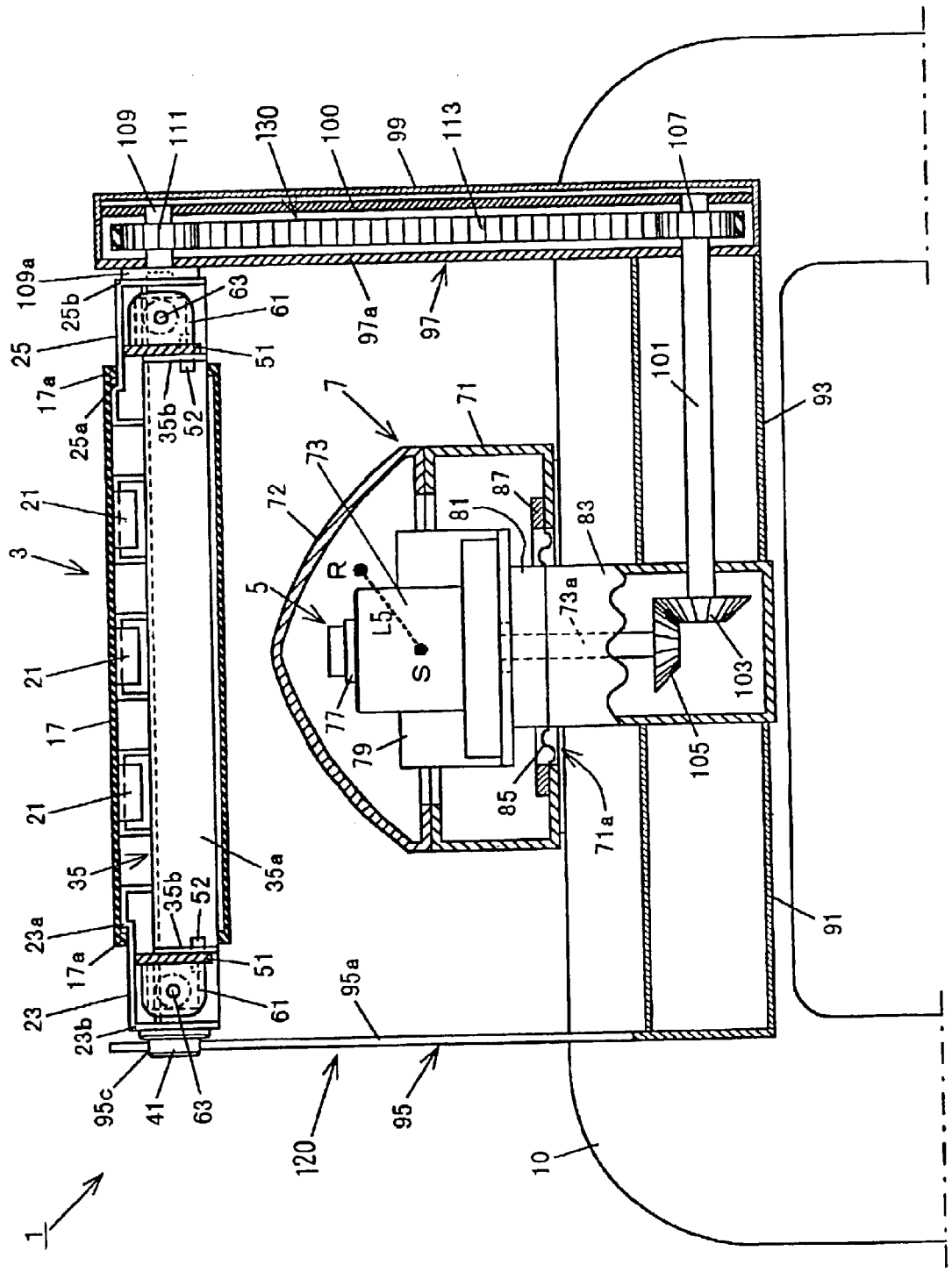
FIG. 20 is a longitudinal sectional view of the weighing conveyor, as viewed from an upstream side towards a downstream side.

The details of the weighing conveyors according to the foregoing sixth to ninth aspects, respectively, will now be described. In the first place, as shown in FIGS. 19 and 20, the center of gravity R of the weighing conveyor 2 is located at a position spaced a short distance L5 from the center of moment S of the load cell 5 with respect to the up and down direction. Also, as shown in FIGS. 18 and 19, the center of gravity R of the weighing conveyor 2 is located at a position spaced a small distance L5 from the center of moment S of the load cell 5 with respect to the direction of transport (the forward and rearward direction) of the articles X to be weighed. Further, as shown in FIGS. 18 and 20, the center of gravity R of the weighing conveyor 2 is located at a position spaced a short distance L5 from the center of moment S of the load cell 5 with respect to the widthwise direction (leftward and rightward direction) of transport of the articles X to be weighed.

With respect to the up and down direction, as shown in FIGS. 19 and 20, the conveyor apparatus 3 is first disposed above the load cell 5 and the drive motor 73 is arranged at a position substantially level with the load cell 5. Accordingly, according to this, the center of gravity R of the weighing conveyor 2 would be excessively spaced upwardly from the center of moment S of the load cell 5. In view of this, the drive shaft 73a of the drive motor 73 is arranged so as to extend downwardly and the drive transmission mechanism 130 (and the support member 120), which is another heavy item, is disposed so as to extend from a position below the load cell 5 towards the conveyor apparatus 3 thereabove. In other words, the drive transmission mechanism 130 and the support member 120 are also positioned at a location below the load cell 5. By this design, a bias of the center of gravity R of the weighing conveyor 2 is rectified, that is, the center of gravity R is lowered, towards a position approaching the center of moment S of the load cell 5.

In contrast thereto, if at this time the drive transmission mechanism 130 is so arranged as to extend upwardly from the position above the load cell 5 or as to extend upwardly from the position substantially level with the load cell 5, the bias of the center of gravity R of the weighing conveyor 2 will not be rectified and, rather, the center of gravity R will undesirably be displaced having been biased further upwardly.

It is to be noted that, for example, the drive motor 73 may be positioned beforehand at a location below the load cell 5.

With respect to the transport direction (the forward and rearward direction), as shown in FIGS. 18 and 19, the load cell 5 is first arranged at a location substantially intermediate of the conveyor apparatus 3 with respect to the transport direction and the drive motor 73 is arranged upstream of the load cell 5 with respect to the transport direction. Accordingly, according to this, the center of gravity R of the weighing conveyor 2 is excessively spaced in a direction upstream of the center of moment S with respect to the transport direction. In view of this, the drive roller 13 is arranged at a location downstream with respect to the transport direction and the drive transmission mechanism 130 (and the support member 120), which is another heavy item, is arranged so as to extend from the position upstream of the load cell 5 towards the drive roller 13 on the downstream side. By this design, a bias of the center of gravity R of the weighing conveyor 2 is rectified, that is, the center of gravity R is shifted in a direction downstream of the transport direction, approaching the center of moment S of the load cell 5.

In contrast thereto, if at this time the drive roller 13 is so arranged as to occupy a position upstream with respect to the transport direction and the drive transmission mechanism 130 is arranged so as to extend only in a region upstream of the load cell 5, the bias of the center of gravity R of the weighing conveyor 2 will not be rectified and, rather, the center of gravity R will undesirably be displaced having been biased in the upstream direction.

It is to be noted that if the drive motor 73 is arranged, for example, downstream of the load cell 5 beforehand with respect to the transport direction, the drive roller 13 is to be arranged upstream of the transport direction and the drive transmission mechanism 130 is to be so arranged as to extend from the position downstream of the load cell 5 towards the position upstream thereof.

With respect to the transport widthwise direction (leftward and rightward direction), as shown in FIGS. 18 and 20, the load cell 5 is at first disposed at a location substantially intermediate of the conveyor apparatus 3 with respect to the transport widthwise direction and the drive motor 73 was disposed at the substantially same position as the load cell 5. Accordingly, in this condition, the center of gravity R of the weighing conveyor 2 coincides with the center of moment S of the load cell 5 in the transport widthwise direction. However, the drive transmission mechanism 130 (and the support member 120), which is another heavy item, has to be disposed between the drive motor 73 and the conveyor apparatus 3 and it can be considered that, at that time, the center of gravity R of the weighing conveyor 2 will displace from the center of moment S of the load cell 5 leftwards or rightwards of the transport widthwise direction.

However, since as compared with the weight of the drive transmission mechanism 130 the weight of the conveyor apparatus 3 and the weight of the drive motor 73 is far heavier, even though the drive transmission mechanism 130 is so disposed as having been displaced either leftwards or rightwards of the transport widthwise direction, the extent to which the center of gravity R of the weighing conveyor 2 displaces from the center of moment S of the load cell 5 will not become so large. Accordingly, the drive transmission mechanism 130 is disposed so as to extend from the position substantially level with the load cell 5 in the transport widthwise direction in a direction leftwards or rightwards of the transport widthwise direction. It is to be noted that at this time the extend to which the center of gravity R of the weighing conveyor 2 is shifted in the transport widthwise direction can be suppressed even in the presence of the support member 120 that is substantially symmetric with respect to the leftward and rightward direction.

Nevertheless, although the use of the two drive transmission mechanisms 130 arranged in symmetric relation to each other with respect to the leftward and rightward direction is preferred, it may occur that the use of the two drive transmission mechanisms would result in complicated rotation of the drive roller 13. Also, the tare weight Wq would increase, and it is no therefore undesirable in terms of the weighing accuracy.

It is to be noted that the drive motor 73 may be arranged, for example, leftwards or rightwards of the load cell 5 beforehand with respect to the transport widthwise direction. In such case, the drive transmission mechanism 130 has to be arranged so as to extend leftwards and rightwards of the transport widthwise direction with the load cell 5 positioned intermediate thereof. In other words, when the drive motor 73 is arranged leftwards of the load cell 5, the drive transmission mechanism 130 has to be arranged so as to extend from left to right. At this time, the drive transmitting timing belt 113 and others are arranged rightwards of the conveyor apparatus 3. Conversely, when the drive motor 73 is arranged rightwards of the load cell 5, the drive transmission mechanism 130 has to be arranged so as to extend from rightwards to leftwards of the load cell 5. At this time the drive transmitting timing belt 113 and others are arranged leftwards of the conveyor apparatus 3.

As discussed hereinabove, since the center of gravity R of the weighing conveyor 2 is spaced a small distance L5 from the center of moment S of the load cell 5 in three dimensions in the up and down direction, the forward and rearward direction and the leftward and rightward direction, the force of moment acting on the load cell 5 can be suppressed to a minimal value. Accordingly, a frequency region of the noise component to be removed that would be generated because of the force of moment can increase enough to allow a low pass filter to perform a filtering process in a reduced time, thereby enabling the weighing operation to speed up and, therefore, the weighing accuracy can be increased.

Moreover, in such case, by tailoring arrangement of the conveyor apparatus 3, the drive motor 73 and the drive transmission mechanism 130 relative to the load cell 5, the center of gravity R of the weighing conveyor 2 so constructed with those components is brought to the location in the close vicinity of the center of moment S of the load cell 5 and, because the center of gravity R of the weighing conveyor 2 is thus brought to the location in the close vicinity of the center of moment S, and not because the conveyor apparatus 3 is designed to have an increased size with the load cell 5 and the drive motor 73 and the drive transmission mechanism 130 accommodated therein, the weight of the conveyor apparatus 3 and, thus, the tare weight Wq of the conveyor apparatus 3 does not increase.

Accordingly, it is possible to minimize both the tare weight Wq and the center-to-center distance L5 and the force of moment acting on the load cell 5 can be effectively and assuredly suppressed down to a minimum value. Therefore, the frequency region of the noise component increases assuredly, the filtering time required for the low pass filter to perform its filtering process is reduced assuredly, and the weighing operation can be speeded up. Also, the weighing accuracy can be increased.

Figure 21:
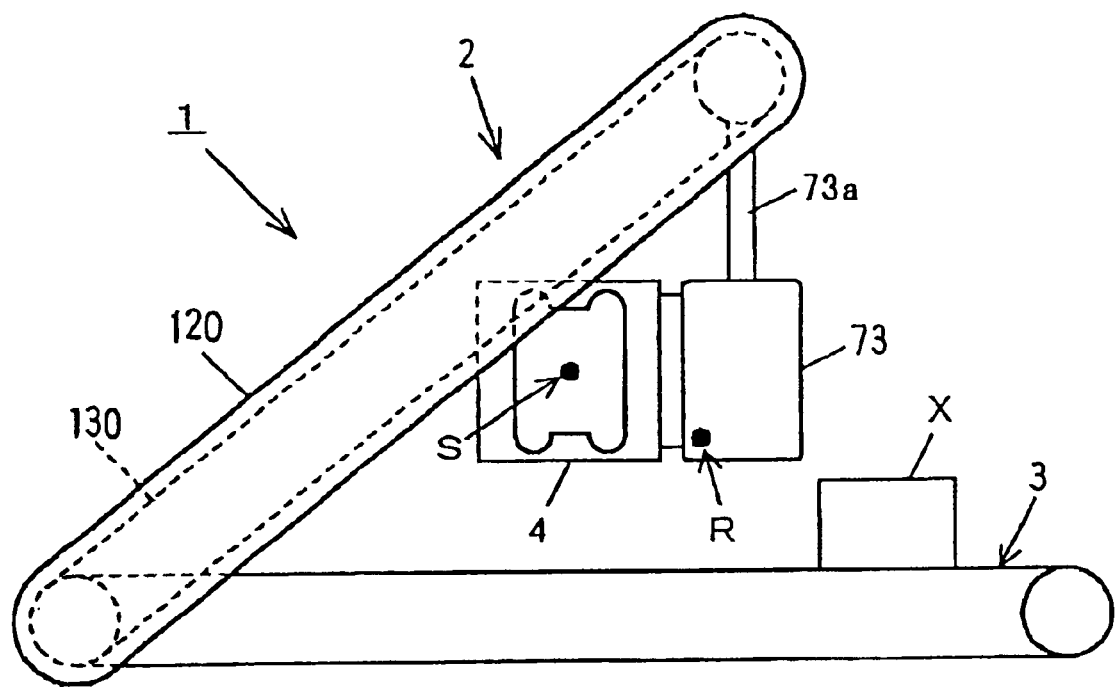
FIG. 21 illustrates a still further preferred embodiment of the weighing conveyor, with a transport mechanism disposed below a load detector.

It is to be noted that although in this embodiment the conveyor apparatus 3 has been arranged above the load cell 5, the conveyor apparatus 3 may be arranged below the load cell 5 as shown in FIG. 21 (a suspended structure). In such case, as shown therein, the drive shaft 73a of the drive motor 73 is arranged, for example, so as to extend upwardly and the drive transmission mechanism 130 and the support member 120 are arranged, for example, so as to extend from a position above the load cell 5 towards the conveyor apparatus 3 positioned below the load cell 5. In other words, in a manner reverse to that described previously, the drive transmission mechanism 130 and a portion of the support member 120 are allowed to exist concurrently at the position above the load cell 5. By this design, the center of gravity R of the weighing conveyor 2 is pulled upwardly to approach the center of moment S of the load cell 5.

It is to be noted that, in such case, the drive motor 73 is positioned in the vicinity of the load cell 5 with respect to the up and down direction. In other words, for example, the drive motor 73 is disposed at the substantially same position as the load cell 5 with respect to the up and down direction or above the load cell 5.

It is also to be noted that although in any of the foregoing embodiments the load cell 5 has been employed as the load detector, the present invention may not be always limited thereto and the load detector of, for example, an electromagnetically balanced type may be employed. In other words, any load detector of a structure wherein one of the opposite end is rendered to be the fixed end while the other of the opposite ends is rendered to be the free end and the load is adapted to be loaded on the free end so that the load can be detected in terms of up and down displacement of the load in the free end can be employed in the practice of the present invention.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed hereto, to be construed as included therein.

What is claimed is:

1. A conveyor apparatus, wherein when a frame structure is bent around a bending fulcrum of the frame structure, an endless transport belt can be mounted on or removed from at least one pair of rollers supported by the frame structure, wherein the bending fulcrum lies at a location at a downwardly offset with respect to a line of extension connecting respective axes of rotation of the rollers together when the frame structure is not bent around the bending fulcrum and is thereby in a straight position, and being adjacent to one of runs of the transport belt, and wherein there is provided a stop member for inhibiting the frame structure from being bent towards the other of the runs of the transport belt when the frame structure is in the straight position.

2. The conveyor apparatus as claimed in claim 1, wherein the other of the runs of the transport belt is a transport surface for the articles to be weighed.

3. The conveyor apparatus as claimed in claim 1, wherein the rollers are rotatable to allow the other of the runs of the transport belt to be held under tension.

4. The conveyor apparatus as claimed in claim 1, wherein there is further provided a biasing member for biasing at least one of the rollers in a direction required for a distance between the rollers to increase.

5. The conveyor apparatus as claimed in claim 1, wherein the transport belt is provided with indentations engageable with the rollers to regulate displacement in position in a direction widthwide thereof.

6. The conveyor apparatus as claimed in claim 1, wherein the frame structure is provided with roofing member for supporting the run of the transport belt from backside thereof and wherein the stop member is defined by the roofing members.

7. A conveyor apparatus wherein when a frame structure is bent around a bending fulcrum of the frame structure, an endless transport belt can be mounted on or removed from at least one pair of rollers supported by the frame structure, said conveyor apparatus comprising a drive source for driving one of the rollers; a pulley mounted on a drive shaft of the drive source; a pulley mounted coaxial with one of the rollers; an endless drive transmitting belt trained between and around the pulleys, wherein the bending fulcrum lies at a location at a downwardly offset with respect to a line of extension of respective axes of rotation of the pulleys when the frame structure is not bent around the bending fulcrum and is thereby in a straight position, and is adjacent to one of runs of the drive transmitting belt; and a stop member for inhibiting the frame structure from being bent towards the other of the runs of the drive transmitting belt when the frame structure is in the straight position.

8. An article inspecting machine equipped with a conveyor apparatus as defined in claim 1 for transporting articles to be inspected successively.

9. An article inspecting machine equipped with a conveyor apparatus as defined in claim 2 for transporting articles to be inspected successively.

10. The article inspecting machine as claimed in claim 8, wherein there is provided an engagement for supporting a conveyor apparatus when engaged with the conveyor apparatus, and wherein the conveyor apparatus and the engagement are engaged with each other when a frame structure of the conveyor apparatus is not bent, but are disengaged from each other when the frame structure of the conveyor apparatus is bent.

11. An apparatus comprising:

a conveyor including
   a frame structure including a bending fulcrum, the frame structure having a straight position and a bent position in which the frame structure is bent around the bending fulcrum,
   a first roller supported by the frame structure and having an axis of rotation,
   a second roller supported by the frame structure and having an axis of rotation that is parallel to the axis of rotation of the first roller, and
   a stop member, wherein
     when the frame structure is in the bent position, an endless transport belt is mountable on, and removable from, the first and second rollers, and
     when the frame structure is in the straight position with an endless transport belt mounted on the first and second rollers,
       the endless transport belt travels around the first and second rollers and thereby provides a first travel surface moving from the first roller to the second roller, and a second travel surface moving from the second roller to the first roller,
       the bending fulcrum is located at a downwardly offset with respect to a straight line connecting a center of the axis of rotation of the first roller with a center of the axis of rotation of the second roller, and is adjacent to one of the first and second travel surfaces, and
       the stop member inhibits the frame structure from being bent towards the other of the first and second travel surfaces.

12. The apparatus as claimed in claim 11, wherein said other of the first and second travel surfaces is a transport surface for articles.

13. The apparatus as claimed in claim 11, wherein the first and second rollers are rotatable to allow said other of the first and second travel surfaces to be held under tension.

14. The apparatus as claimed in claim 11, further comprising:

a biasing member biasing at least one of the first and second rollers in a direction required for a distance between the first and second rollers to increase.

15. The apparatus as claimed in claim 11, wherein the endless transport belt is provided with indentations engageable with the first and second rollers to regulate displacement in position in a direction widthwide thereof.

16. The apparatus as claimed in claim 11, wherein the stop member is a roofing member of the frame structure.

17. A conveyor apparatus, wherein when a frame structure is bent, an endless transport belt can be mounted on or removed from at least one pair of rollers supported by the frame structure, wherein a bending fulcrum of the frame structure lies at a location on one side of a line of extension, connecting respective axes of rotation of the rollers together when the frame structure is not bent, adjacent one of runs of the transport belt, and wherein there is provided a stop member for inhibiting the frame structure from being bent towards the other of the runs of the transport belt, wherein the frame structure is provided with roofing member for supporting the run of the transport belt from backside thereof and wherein the stop member is defined by the roofing members.

* * * * *